United States Patent
Fan et al.

(10) Patent No.: US 10,800,987 B2
(45) Date of Patent: *Oct. 13, 2020

(54) COMPOSITE IRON-SODIUM CATALYST FOR COAL GASIFICATION

(71) Applicant: UNIVERSITY OF WYOMING, Laramie, WY (US)

(72) Inventors: Maohong Fan, Ames, IA (US); Rodolfo Monterrozo, Guatemala (GT)

(73) Assignee: UNIVERSITY OF WYOMING, Laramie, WY (US)

( * ) Notice: Subject to any disclaimer, the term of this patent is extended or adjusted under 35 U.S.C. 154(b) by 1255 days.

This patent is subject to a terminal disclaimer.

(21) Appl. No.: 14/750,550

(22) Filed: Jun. 25, 2015

(65) Prior Publication Data

US 2015/0376517 A1 Dec. 31, 2015

Related U.S. Application Data

(60) Provisional application No. 62/018,425, filed on Jun. 27, 2014.

(51) Int. Cl.
*C10J 3/02* (2006.01)

(52) U.S. Cl.
CPC ............. *C10J 3/02* (2013.01); *C10J 2200/33* (2013.01); *C10J 2300/0933* (2013.01);
(Continued)

(58) Field of Classification Search
CPC ................. C10J 3/00; C10J 2300/0906; C10J 2300/093; C10J 2300/0976; C10J 2300/0986; Y02E 20/18
See application file for complete search history.

(56) References Cited

U.S. PATENT DOCUMENTS

| 4,112,245 A | 9/1978 | Zehner et al. |
| 4,334,893 A * | 6/1982 | Lang ............ B01J 23/02 252/373 |

(Continued)

OTHER PUBLICATIONS

Monterrozo, Rodolfo, Effects and characterization of an environmentally-friendly, inexpensive composite iron-sodium catalyst on coal gasification, Ph.D., Department of Chemical & Petroleum Engineering, Dec. 2013.*

(Continued)

*Primary Examiner* — Amber R Orlando
*Assistant Examiner* — Syed T Iqbal
(74) *Attorney, Agent, or Firm* — Patterson + Sheridan, LLP

(57) ABSTRACT

Embodiments described herein generally relate to a composite carbonate utilized as a catalyst in coal gasification processes. Methods described herein also include suitable processing conditions for performing coal gasification with the composite catalyst. In certain embodiments the composite catalyst may comprise an alkali carbonate and a transition metal carbonate, for example, an $FeCO_3$—$Na_2CO_3$ catalyst. An $FeCO_3$—$Na_2CO_3$ catalyst, compared to raw coal, may increase the carbon conversion rate by about two times within the 700° C.-800° C. range due to its ability to reduce the activation energy of gasification by about 30-40%. Compared to pure sodium and pure iron catalysts, the composite catalyst may increase the yields of desired products $H_2$ and CO at 800° C. by 14.8% and 40.2%, respectively.

13 Claims, 12 Drawing Sheets
(11 of 12 Drawing Sheet(s) Filed in Color)

(52) U.S. Cl.
CPC .......... *C10J 2300/0976* (2013.01); *C10J 2300/0986* (2013.01); *C10J 2300/1253* (2013.01); *Y02E 20/18* (2013.01); *Y02P 20/52* (2015.11)

(56) References Cited

U.S. PATENT DOCUMENTS

| | | | |
|---|---|---|---|
| 4,453,026 A | 6/1984 | Tahara et al. | |
| 4,496,781 A | 1/1985 | Jacobson et al. | |
| 4,551,565 A | 11/1985 | Miyazaki et al. | |
| 4,614,728 A | 9/1986 | Hirai et al. | |
| 4,628,128 A | 12/1986 | Bartley | |
| 4,628,129 A | 12/1986 | Bartley | |
| 4,647,551 A | 3/1987 | Miyazaki et al. | |
| 4,652,685 A | 3/1987 | Cawse et al. | |
| 4,677,234 A | 6/1987 | Bartley | |
| 5,133,780 A * | 7/1992 | Sadowski | C10J 3/20 48/63 |
| 5,345,005 A | 9/1994 | Thakur et al. | |
| 2001/0039760 A1 * | 11/2001 | Cheng | C10J 3/00 48/197 R |
| 2005/0121646 A1 | 6/2005 | Matsuoka et al. | |
| 2008/0164443 A1 * | 7/2008 | White | B01J 23/002 252/373 |
| 2009/0018222 A1 * | 1/2009 | Klepper | C01B 3/16 518/704 |
| 2011/0168605 A1 * | 7/2011 | Blevins | C10G 2/32 208/85 |
| 2013/0032761 A1 * | 2/2013 | Fan | C10J 3/00 252/372 |

OTHER PUBLICATIONS

Popa et al. "Catalytic gasification of a Powder River Basin coal" Fuel vol. 103, Jan. 2013, pp. 161-170.*

Zheng, Jianwei et al., "Efficient low-temperature selective hydrogenation of esters on bimetallic Au—Ag/SBA-15 catalyst", Elsevier, 2013, pp. 110-118.

Zhao, Tie-Jun et al., "Synthesis of Dimethyl Oxalate from CO and CH3ONO on Carbon Nanofiber Supported Palladium Catalysts", American Chemical Society, May 28, 2004, pp. 4595-4601.

Zhang, Xu et al., "Deactivation behavior of SiO2 supported copper catalyst in hydrogenation of diethyl oxalate", Journal of Fuel Chemistry and Technology, Sep. 2011, pp. 702-705.

Yue, Hairong et al., "Hydrogenation of Dimethyl Oxalate to Ethylene Glycol on a Cu/SiO2/Cordierite Monolithic Catalyst: Enhanced Internal Mass Transfer and Stability", American Institute of Chemical Engineers, pp. 2798-2809.

Yin, Anyuan et al., "Highly active and selective copper-containing HMS catalyst in the hydrogenation of dimethyl oxalate to ethylene glycol", Elsevier, 2008, pp. 91-99.

Yin, Anyuan et al., "Ag/MCM-41 as a highly efficient mesostructured catalyst for the chemoselective synthesis of methyl glycolate and ethylene glycol", Elsevier, 2011, pp. 90-99.

Xu, Gen-hui et al., "Kinetics of the Hydrogenation of Diethyl Oxalate to Ethylene Glycol", American Chemical Society, 1995, pp. 2371-2378.

Wen, Chao et al., "Remarkable Improvement of Catalytic Performance for a New Cobalt-Decorated Cu/HMS Catalyst in the Hydrogenation of Dimethyloxalate", Wiley-VCH Verlag GmbH& Co. KGaA, Weinheim, 2013, pp. 138-141.

Ward, John W., A Spectroscopic Study of the Surface of Zeolite Y. II. Infrared Spectra of Structural Hydroxyl Groups and Adsorbed Water on Alkali, Alkaline Earth, and Rare Earth Ion-Exchanged Zeolites, the Journal of Physical Chemistry—American Chemical Society, Nov. 1968, pp. 4211-4223.

Wang, Shengping et al., "Pd—Fe/a-Al2O3/cordierite monolithic catalysts for the synthesis of dimethyl oxalate: effects of calcination and structure", Higher Education Press and Springer-Verlag Berlin Heidelberg, 2012, pp. 259-269.

Wang, Shengping et al., "Characterization and catalytic activity of TiO2/SiO2 for transesterification of dimethyl oxalate with phenol", Elsevier, 2004, pp. 273-279.

Thomas, D. J. et al., "Hydrogenolysis of diethyl oxalate over copper-based catalysts", Elsevier Science Publishers B. V., Amsterdam, 1992, pp. 101-114.

Randall, D.J. et al., "Ammonia toxicity in fish", Elsevier, 2002, pp. 17-23.

Ma, Xinbin et al., "Hydrogenation of Dimethyl Oxalate to Ethylene Glycol over Mesoporous Cu-MCM-41 Catalysts", American Institute of Chemical Engineers, Jul. 2013, pp. 2530-2539.

Lin, Haiqiang et al., "Cu/SiO2 hybrid catalysts containing HZSM-5 with enhanced activity and stability for selective hydrogenation of dimethyl oxalate to ethylene glycol", Elsevier, 2012, pp. 287-296.

Li, Xinbao et al., "Ethylene Glycol and Ethanol Synthesis from Dimethyl Oxalate Hydrogenation on the Cu/ZnO/SiO2 Catalysts", State Key Laboratory of Clean Energy Utilization, pp. 15-18.

Li, Zhenhua et al., "Effect of alkyl nitrite decomposition on catalytic performance of CO coupling reaction over supported palladium catalyst", Higher Education Press and Springer-Verlag Berlin Heidelberg, 2012, pp. 410-414.

Jacobs, Peter A. et al., "Evidence for the Nature of True Lewis Sites in Faujasite-Type Zeolites", American Chemical Society, 1979, pp. 1174-1177.

DeCanio Stephen J. et al., "Acid Catalysis by Dealuminated Zeolite-Y", Academic Press, Inc., 1986, pp. 132-141.

Ge, Yadong et al., "Influence of crystalline phase of Li—Al—O oxides on the activity of Wacker-type catalysts in dimethyl carbonate synthesis", Higher Education Press and Springer-Verlag Berlin Heidelberg, 2012, pp. 415-422.

Fernández, María B. et al., "Hydrogenation of sunflower oil over different palladium supported catalysts: Activity and selectivity", Elsevier, 2009, pp. 941-949.

* cited by examiner

COMPOSITE IRON-SODIUM CATALYST FOR COAL GASIFICATION

CROSS-REFERENCE TO RELATED APPLICATIONS

This application claims benefit of U.S. provisional patent application Ser. No. 62/018,425, filed Jun. 27, 2014, the entirety of which is incorporated herein by reference.

BACKGROUND

1. Field

Embodiments described herein generally relate to catalytic gasification of coal. More specifically, embodiments described herein relate to coal gasification with a composite iron-sodium catalyst.

2. Description of the Related Art

Integrated gasification combined cycle (IGCC) of coal offers the advantages of higher efficiency and capability of $CO_2$ and pollutant separation compared to conventional coal-fired power plant processes. One important aspect of IGCC is coal gasification, which occurs within an energy-intensive high temperature environment. Coal gasification has been commercially used in the production of fuels and chemicals. However, because the energy needed to achieve gasification temperatures is obtained from exothermic combustion reactions prior to gasification, the rate at which the pre-gasification process and gasification occur need to be increased in order to achieve lower operating temperatures and to reduce energy consumption. Furthermore, there is a need to increase the ratio of gases that preserve the highest heat of combustion, e.g., carbon monoxide and hydrogen versus carbon dioxide and water. Therefore, the power generation industry and other natural resource industries are increasingly interested in using catalysts to improve coal gasification. Various single catalysts for use in coal gasification have been investigated, but many are often cost prohibitive on an industrial scale, and/or yield low amounts of desired products. Composite catalysts comprising an alkali carbonate and a transition metal carbonate are potential gasification catalysts due to their abundance, low cost, and environmentally friendliness. Catalysts have the capacity of lowering the gasification temperature, increasing the conversion rates, and enhancing the production of the desired gases by changing the selectivity in the process.

Different catalysts have been previously investigated. To illustrate, Douchanov and Angelova et al. studied the effect of 13 metallic salts on the gasification rate of a lignite coal and found improvements when comparing these rates to those obtained with non-catalytic coal gasification. Kasaoka et al. studied the effect of Fe, Co, Ni, An, and Li on different types of activated carbon and other carbon chars using non-coking coal from Uonuki, Japan, moderate coking coal from Kuznetsk, Russia, and strong coking Pittston coal from Pennsylvania.

Furthermore, iron based catalysts have demonstrated many benefits, such as low cost, availability, and environmental friendliness. Different iron compounds have been tested as catalysts for coal gasification. As such, it has been determined that an $FeCO_3$ catalyst reduces the activation energy of the gasification of subbituminous Wyodak coal. Additionally, iron based catalysts demonstrate a strong ability to alleviate tar, a common problem in gasification. Cypres et al. determined that while ferric oxide and ferrous oxide did not possess any catalytic activity, the tars were initially oxidized, the devolatilization rate during pyrolysis of the coal was reduced, and the composition of the tar remained unchanged. It has also been determined that hematite produced by the addition of iron as a catalyst maintains a high impact on tar breakdown. The extent of this effect is larger with hematite than with magnetite or wüstite through the 600° C.-800° C. temperature range.

Sodium based catalysts, which are widely available and inexpensive, have also demonstrated improvements in the kinetics of gasification. Popa et al. utilized $Na_2CO_3$ as a catalyst and found increases in the carbon conversion rates during both the pyrolysis and gasification steps, as well as a decrease in the activation energy. However, the use of $Na_2CO_3$ has caused the formation of more non-volatile tars that condense at lower temperatures downstream of the gasifier. Liquid tar from coal gasification produces a number of adverse effects throughout the process, including plugging. The removal of this material is complicated and time consuming because it combines with sticky ash. The sticky ash subsequently turns into a highly viscous paste. Thus, the overall efficiency of the process is hindered and less desirable in terms of cost-effectiveness and applicability.

As described above, single sodium-based and single iron-based catalysts may be advantageous in coal gasification processes, however single sodium-based catalysts and single iron-based catalysts each have shortcomings as described above. In order to overcome the shortcomings of the individual sodium-based or iron-based catalysts gasification studies have been performed using sodium and iron composite catalysts. However, the reported composite catalysts contain anions including $SO_4^{2-}$ and $NO_3^-$, which may damage gasification equipment, harm the environment, and are undesired for the production of high-quality syngas. Moreover, $H_2$, CO, and $CO_2$ yields may be less than desirable depending on the catalyst utilized.

Thus, what is needed in the art are improved composite coal gasification catalysts and methods of utilizing catalysts in coal gasification processes to improve conversion, minimize deleterious effects of by-products, and improve cost-effectiveness, all with minimal environmental impact.

SUMMARY

In one embodiment, a coal gasification method is provided. The method includes mixing a coal derived solid with a composite catalyst to form a reaction mixture. The composite catalyst comprises an alkali carbonate and a transition metal carbonate. The method further includes heating the reaction mixture to a target temperature between about 700° C. and about 900° C., contacting the reaction mixture with water vapor, and forming a syngas mixture from the reaction mixture.

In another embodiment, a coal gasification method is provided. The method includes forming a reaction mixture comprising a coal derived powder and a composite catalyst by mixing the coal derived powder and the composite catalyst. The composite catalyst includes an alkali carbonate and a transition metal carbonate. The method further includes heating the reaction mixture to a target temperature between about 700° C. and about 900° C., contacting the reaction mixture with steam, and flowing the reaction mixture and the steam into a gasifier. Additionally, the method includes flowing nitrogen into the gasifier, maintaining a pressure of the gasifier below about 1 atm, and forming a syngas mixture from the reaction mixture.

In yet another embodiment, method of forming a syngas from coal is provided. The method includes mixing a powdered coal having a moisture content of at least about 10 wt % with between about 3 wt % and about 5 wt % of a composite catalyst to form a reaction mixture. The composite mixture includes a sodium carbonate catalyst and an iron carbonate catalyst. The method further includes blending a stoichiometric excess of water vapor with the reaction mixture, disposing the reaction mixture in a gasifier, adding nitrogen to the gasifier, and maintaining a temperature of the reaction mixture between about 700° C. and about 900° C. until a syngas mixture is formed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
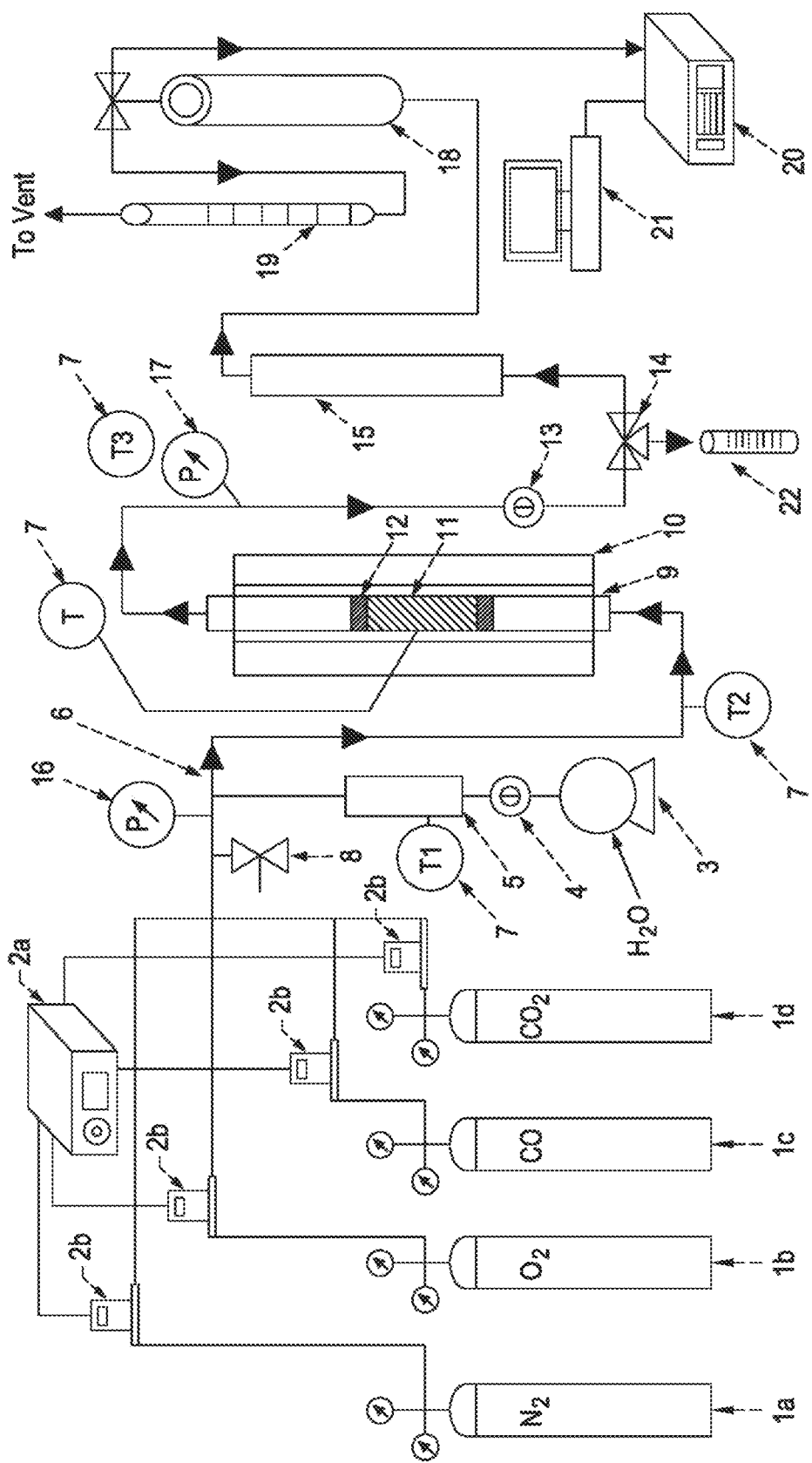
FIG. 1 illustrates a schematic diagram of coal gasification apparatus according to one embodiment described herein.

Embodiments described herein generally relate to a composite carbonate utilized as a catalyst in coal gasification processes. Methods described herein also include suitable processing conditions for performing coal gasification with the composite catalyst. In certain embodiments, the composite catalyst may comprise an alkali carbonate and a transition metal carbonate, for example, an $FeCO_3$—$Na_2CO_3$ catalyst.

A composite catalyst may be utilized to catalyze coal gasification reactions and improve the yield of syngas, which includes $H_2$, CO, and $CO_2$, among other gases and byproducts. By lowering the activation energy required to perform coal gasification, an $FeCO_3$—$Na_2CO_3$ catalyst improves the efficiency of coal gasification and also reduces the amount of coal tar generated during coal gasification by increasing the volatility of coal tar. A composite catalyst such as $FeCO_3$—$Na_2CO_3$ is relatively inexpensive, making $FeCO_3$—$Na_2CO_3$ a suitable catalyst for industrial scale applications. Furthermore, results provide that as compared to raw coal, the composite catalyst $FeCO_3$—$Na_2CO_3$ is efficient in increasing the carbon conversion rate constant by approximately between about 1.5 times and about 2.5 times within the 700° C.-800° C. range due to its ability to reduce the activation energy of gasification by about 30-40%. Results further provided that as compared to pure sodium, the composite catalyst $FeCO_3$—$Na_2CO_3$ provided increased yields of desired products $H_2$ and CO at 800° C. by between about 10% and about 20%, for example, about 15%. Results further provided that as compared to pure iron, the composite catalyst provided increased yields of desired products $H_2$ and CO at 800° C. by between about 30% and about 50%, for example, about 40%. While the examples provided herein are described with regard to results obtained in a laboratory setting, it is contemplated that the processes and methods below may be scaled up for commercial and industrial applications.

EXPERIMENTAL SECTION

Material Preparation

Catalytic gasification of a Wyodak low-sulfur sub-bituminous coal from the Powder River Basin of Wyoming was investigated using an inexpensive composite catalyst applied via incipient wetness impregnation. Experiments in an atmospheric pressure fixed-bed laboratory gasifier were performed to evaluate the effects of reaction temperature, feed gas steam content, and $FeCO_3$—$Na_2CO_3$ loading on the catalytic gasification of the Wyodak coal. The $FeCO_3$—$Na_2CO_3$ catalyst is active in both pyrolysis and gasification operations, and may increase carbon conversion rate and reduce the activation energy of coal gasification.

Aqueous solutions were prepared by mixing $Fe_2(SO_4)_3 \cdot 9H_2O$ (99.81% Matheson, Coleman & Bell) with $Na_2CO_3$ (99.81% FMC Inc.) in a 10% (w/w) solution. The resulting $FeCO_3$ precipitate was filtered, washed with sodium carbonate and distilled water, dried at 92° C. and calcined at 250° C. to form a brown powder. This material ($FeCO_3$) was screened on a 125 micrometer sieve to exclude larger particles and stored in air tight, dark colored recipients in order to prevent structural and moisture content changes. Additionally, $Na_2CO_3$ 10% (w/w) solutions were prepared with $Na_2CO_3$ (99.81% FMC Inc.).

Pure $FeCO_3$, pure $Na_2CO_3$, and $FeCO_3$—$Na_2CO_3$ were each loaded on an individual coal for catalytic gasification. The catalyst and coal mixtures were prepared by adding the appropriate amounts of $FeCO_3$, $Na_2CO_3$, or $FeCO_3$—$Na_2CO_3$ to PRB pulverized coal to obtain the following weight ratios of catalyst to dry ash free (DAF) basis coal: 0%-Fe+4%-Na, 1%-Fe+3%-Na, 2%-Fe+2%-Na, 3%-Fe+1%-Na, and 4%-Fe+0%-Na.

The pure iron catalyst and coal mixture was produced by dry mixing predetermined quantities of $FeCO_3$ with raw Wyodak coal from the Wyoming Powder River Basin (PRB). Subsequently, distilled water was added to the iron catalyst and coal mixture to create a paste. The paste was dried at about 90° C. for about 72 hours prior to gasification.

The pure sodium catalyst and coal mixture was produced by dry mixing predetermined quantities of $Na_2CO_3$ with raw Wyodak coal from the Wyoming Power River Basin (PRB). Subsequently, distilled water was added to the sodium catalyst and coal mixture to create a paste. The paste was dried at about 90° C. for about 72 hours prior to gasification.

The composite catalyst and coal mixture was produced by dry mixing predetermined quantities of pure iron catalyst and pure sodium catalyst to raw Wyodak coal from the Wyoming Powder River Basin (PRB). Subsequently, distilled water was added to the iron catalyst, sodium catalyst, and coal mixture to create a paste. The paste was dried at about 90° C. for about 72 hours prior to gasification.

Characterization

Thermo-gravimetric analysis (TGA) tests were performed using a TA Instruments SDT Q600 apparatus. The first TGA operation loaded an approximately 50 mg coal sample into a ceramic capped alumina sample holder, which was followed by 10 minutes of isothermal equilibration, heating at 20° C./min within a 100 ml/min flowing Ar or $N_2$ (Ultra High Purity (UHP), US Welding) environment to a maximum pyrolysis temperature of 1200° C. The sample was held at the temperature for another 10 minutes for isothermal equilibration. The weight percentage of the char generated at a given temperature was calculated using the weight of the residual material (char) in the sample pan of the TGA apparatus at the particular temperature relative to the initial weight of coal sample.

Catalytic Gasification

FIG. 1 illustrates a gasification apparatus utilized to perform the processes described herein. FIG. 1 shows a schematic diagram of catalytic coal gasification with the following reference numerals: (1a) $N_2$, (1b) $O_2$, (1c) CO, (1d) $CO_2$; (2a) mass flow controller; (2b) controller; (3) high pressure pump; (4) back pressure regulator; (5) boiler; (6) heat traced stainless steel tubing; (7) thermocouples; (8) pressure relief valve; (9) stainless steel reactor; (10) furnace; (11) coal; (12) ceramic wool stopper; (13) back pressure regulator; (14) three way valve; (15) water-cooled condenser; (16)-(17) pressure gauges; (18) water trap; (19) flow meter (GC); (20) gas chromatograph (GC); (21) data acquisition system; and (22) water condensing and tar collection. The gasifier body is a stainless steel tube in a tube furnace. All tests were conducted at a pressure slightly above the ambient atmospheric pressure in laboratory. Note that due to the elevation of the testing laboratory (2,200 m), the ambient atmospheric pressure is about 75 kPa. Thus, the catalyzed coal gasification process may be performed at about 1 atm or less than about 1 atm. Catalyst-loaded coal samples were gasified in $H_2O$—$N_2$ mixtures.

Gaseous product compositions were measured by gas chromatography. A quantity of coal sample corresponding to approximately five grams of dry and ash free (DAF) coal was used for each gasification test. A composite catalyst was added to the coal to form a reaction mixture. In certain embodiments, the composite catalyst may comprise an alkali carbonate and a transition metal carbonate. In certain embodiments, the alkali carbonate may be a sodium carbonate catalyst. In another embodiment, the transition metal carbonate may be an iron carbonate catalyst. In another embodiment, the composite catalyst may comprise a sodium carbonate catalyst and an iron carbonate catalyst. The examples described herein provide for a reaction mixture comprising about 4 wt % composite catalyst. In certain embodiments, the composite catalyst may be provided in the reaction mixture between about 1 wt % and about 5 wt %. In other embodiments, the composite catalyst may be provided in the reaction mixture in the following amounts (1) about 1 wt %-Fe and about 3 wt %-Na, (2) about 2 wt %-Fe and about 2 wt %-Na, and (3) about 3 wt %-Fe and about 1 wt %-Na. Each DAF coal sample may be initially pyrolyzed by heating at 20° C./min to the desired gasification temperatures of 700° C., 750° C., 800° C., 850° C., and 900° C. in flowing $N_2$. The resulting chars were then gasified by introducing $H_2O$ and $N_2$ with flow rates of 0.04 g/min and 4.1 ml/min, respectively. The gasification experiments were performed at ambient atmospheric pressure (approximately 75 kPa).

The reaction mixture was heated in $N_2$ at 20° C./minute to the desired gasification temperature and then water vapor was introduced. In one embodiment, the water vapor was introduced at a rate of about 0.04 g/min. In one embodiment, the water vapor is introduced in stoichiometric excess of the reaction mixture. The coal gasification kinetic experiments used the following inlet gases (1): $N_2$ (UHP, US Welding), $O_2$ (UHP, Air Liquide), CO (UHP, US Welding), and $CO_2$ (UHP, Praxair). The aforementioned gases may be omitted in a process for gasifying coal according to the methods described herein.

The flow rate of each gas into the process was controlled via the mass flow controller 2a (Porter Instruments series 201) with a 4 channel PCIM4 controller. Water was supplied by the high pressure pump 3 (Scientific Systems-Lab Alliance Series 1) with the back pressure regulator 4 (GO Regulator) and vaporized in a coil type vaporizer 5 wrapped with heating tape, although any source of steam or water vapor may be used.

The stainless steel tubing before and after the reactor was heat traced 6, with the temperatures of the tubing monitored by thermocouples 7 as indicated, to preheat the gas/water vapor mixture and to prevent coal tar and water condensation in the reactor outlet. Alternately, the tubing, or piping, before and after the reactor may be insulated.

The reactor assembly consisted of a ½ inch (13 mm) diameter tubular stainless steel reactor 9, with ceramic wool 12 supporting the coal sample. Outside the reactor, ceramic wool was also used for additional insulation, although any suitable material known in the art may be used for insulation and/or support.

The reactor was temperature controlled in the tube furnace 10 (Thermolyne 21100), although any suitable heat source may be used, including piping inside the reactor that contains a hot material such as hot oil or steam. In another alternate embodiment, an inert gas may be heated outside the reactor and flowed into the reactor to deliver heat.

The water cooled condenser 15 was utilized to separate the tar and water in the product gas from syngas produced as a result of the coal gasification process. The tar and water were also collected for analysis. The system pressure was regulated by the back pressure regulator 13 (GO Regulator) and monitored using pressure gauges 16, 17. The reactor was protected against over-pressure using a pressure relief valve 8. The flow rate of the remaining product gases was measured before venting to the fume hood. Alternately, the product gases may be collected, stored, subsequently processed or purified, and/or shipped via container or pipeline. For experimental purposes, a slipstream was diverted through a desiccant-filled water trap 18 to the gas chromatograph 20 (Agilent 3000A micro GC) equipped with two micro-columns (18 m MolSieve 5A PLOT and 4 m PoraPlot U) to separate $H_2$, CO, $N_2$, $CO_2$, and light hydrocarbons, such as $CH_4$, prior to concentration analysis using a calibrated thermal conductivity detector (TCD). All data were recorded on the data acquisition system 21.

Residence time of the catalyzed coal at reaction conditions may be up to 5,000 minutes and is usually at least about 100 minutes, such as between about 100 minutes and about 3,000 minutes, for example between about 100 minutes and about 2,000 minutes. At higher temperatures, lower residence times may be used. For example, a residence time between about 50 minutes and about 100 minutes, such as about 80 minutes may be used.

RESULTS AND DISCUSSION

Catalytic Effect of Coal Pyrolysis

Figure 2:
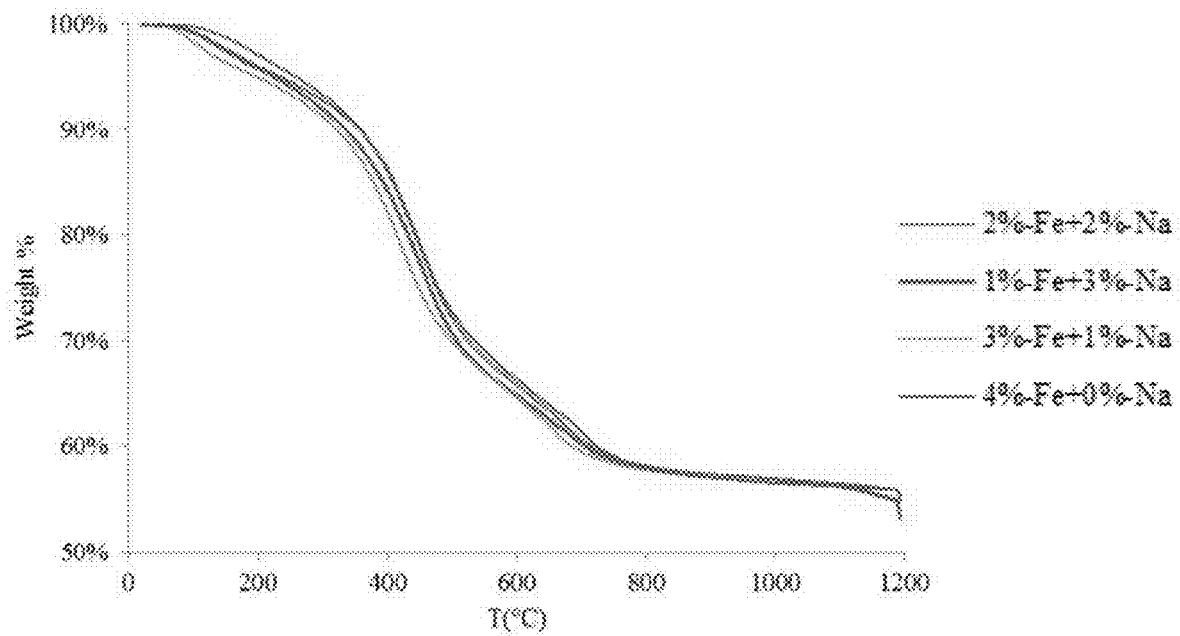
FIG. 2 is a graph illustrating thermogravimetric analysis (TGA) data for coal samples treated with different amounts of composite catalyst during pyrolysis according to one embodiment described herein.

FIG. 2 is a graph illustrating pyrolysis results for four Wyodak coal samples from the Wyoming Powder River Basin (PRB) each loaded with different composite catalysts. FIG. 2 illustrates that the 3%-Fe+1%-Na catalyst and coal mixture was the most effective in increasing the rate of pyrolysis as it led to the highest mass loss during the pyrolysis process. The coals loaded with 4%-Fe+0%-Na and the 2%-Fe+2%-Na catalysts displayed the lowest pyrolysis rates, while the coals loaded with 2%-Fe+2%-Na lagged initially at temperatures below about 375° C. Coals loaded with 4%-Fe+0%-Na had the least mass loss between about 500 and 750° C. Despite these differences, all of the coal samples reached approximately the same mass at temperatures higher than about 750° C. It should be noted that all the tests were done three times at the same conditions and the reported data are the average values of the triple tests.

Factors Affecting Yields of CO, $CO_2$, and $H_2$

The composition of the syngas generated is an indicator for the overall performance of the gasification process. The syngas composition also affects the application of the syngas. It should be noted, however, that $CH_4$ was not studied in detail due to low (<1% of the gaseous product) yields obtained. Low yields were mainly obtained due to the coal used and the gasification conditions chosen. Mass balances were performed to obtain the yields of CO and $H_2$. The values used to perform the mass balances were the remaining mass of char after pyrolysis up to the gasification test temperature and the amount of carbon in the char, which were obtained with the TGA and ultimate analyses, respectively. Table 1 lists the ultimate analyses of the char samples generated from the coal loaded with various amounts of the composite catalysts at different temperatures. As shown in Table 1, the carbon content generally increased at the expense of hydrogen and oxygen with increasing pyrolysis temperatures, consistent with the formation of more refractory chars.

TABLE 1

| Sample ID | Pyrolysis Temperature | Ash (wt %) | C (wt %) | H (wt %) | N (wt %) | S (wt %) |
|---|---|---|---|---|---|---|
| 4%-Fe + 0%-Na | 700 | 18.19 | 79.00 | 1.09 | 1.21 | 0.51 |
| 4%-Fe + 0%-Na | 800 | 16.57 | 81.22 | 0.76 | 1.40 | 0.36 |
| 4%-Fe + 0%-Na | 900 | 16.09 | 81.83 | 0.44 | 0.95 | 0.73 |
| 3%-Fe + 1%-Na | 700 | 16.79 | 80.39 | 1.08 | 1.26 | 0.47 |
| 3%-Fe + 1%-Na | 800 | 15.75 | 82.11 | 0.56 | 1.19 | 0.38 |
| 3%-Fe + 1%-Na | 900 | 13.26 | 85.33 | 0.15 | 0.82 | 0.44 |
| 2%-Fe + 2%-Na | 700 | 16.12 | 81.30 | 0.94 | 1.33 | 0.32 |
| 2%-Fe + 2%-Na | 800 | 15.79 | 82.03 | 0.62 | 1.10 | 0.47 |
| 2%-Fe + 2%-Na | 900 | 13.90 | 84.14 | 0.29 | 1.08 | 0.58 |
| 1%-Fe + 3%-Na | 700 | 15.31 | 82.03 | 0.94 | 1.47 | 0.25 |
| 1%-Fe + 3%-Na | 800 | 13.78 | 83.93 | 0.65 | 0.97 | 0.67 |
| 1%-Fe + 3%-Na | 900 | 13.52 | 84.91 | 0.21 | 1.05 | 0.30 |

Composition of the Catalyst and Pyrolysis Temperature

Figure 3:
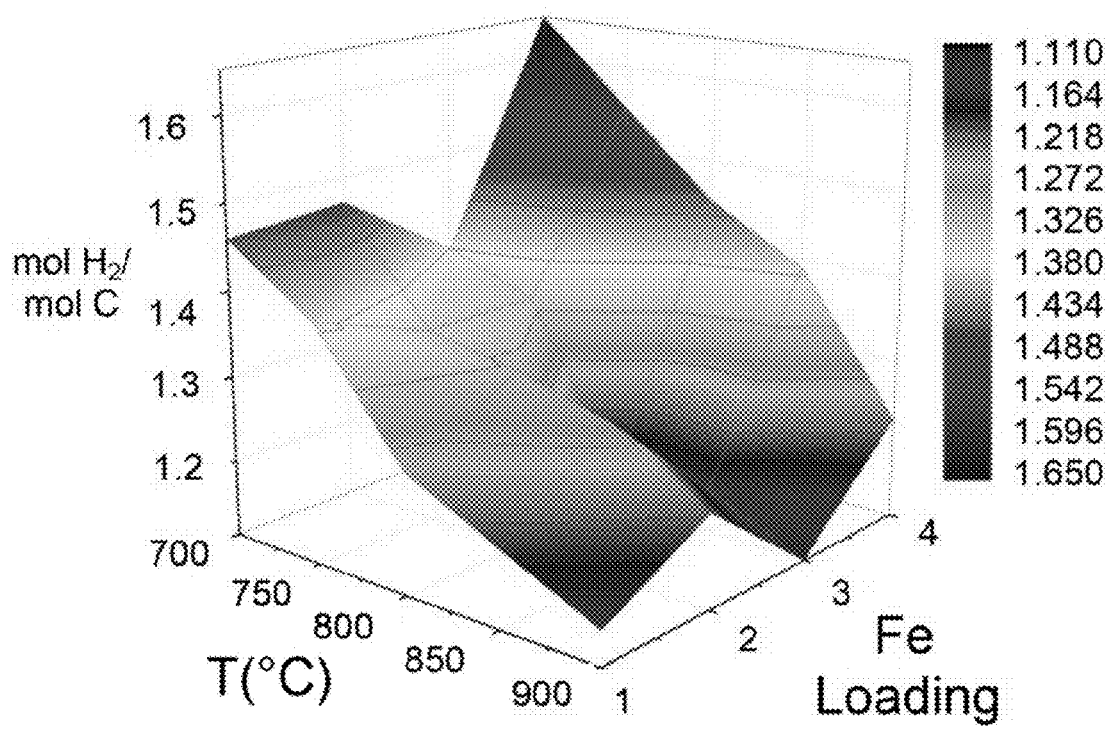
FIG. 3 is a graph illustrating the molar yield of $H_2$ per mole of carbon in the char as a function of iron loading and pyrolysis temperature according to one embodiment described herein.
Figure 4A:
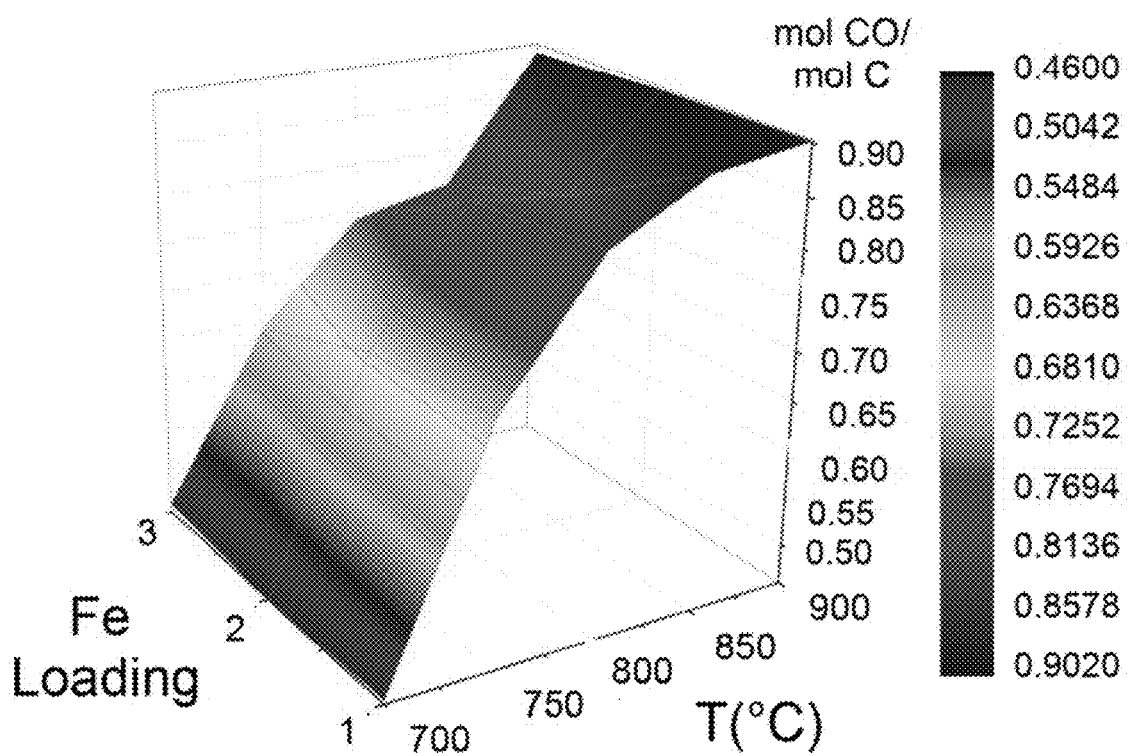
FIG. 4A is a graph illustrating the average molar yield of CO per mole of carbon in the char carbon versus variable loadings of iron carbonate and temperatures according to one embodiment described herein.
Figure 4B:
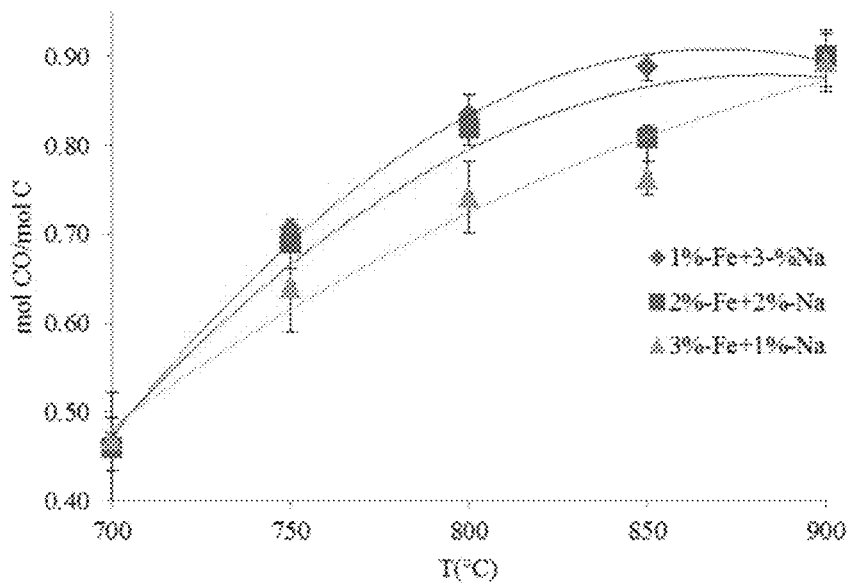
FIG. 4B is a graph illustrating the average molar yield of CO per mole of carbon in the char carbon versus variable loadings of iron carbonate and temperatures with error bars according to one embodiment described herein.
Figure 5A:
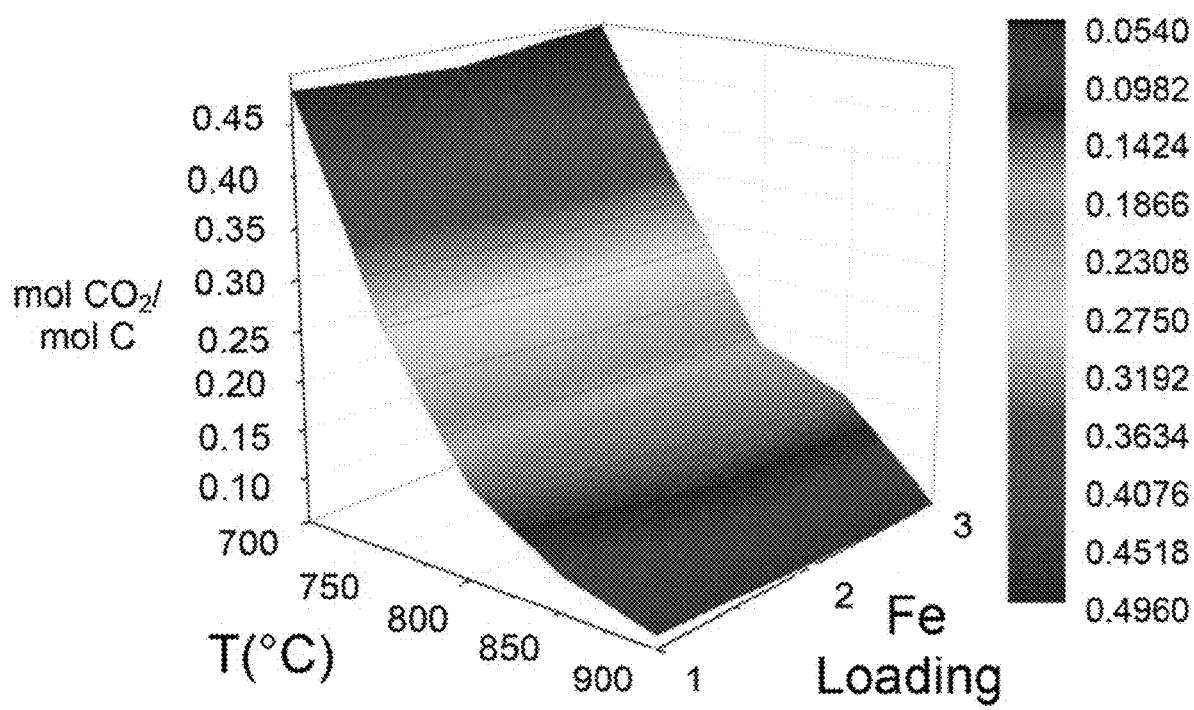
FIG. 5A is a graph illustrating the average molar yield of $CO_2$ per mole of carbon in the char carbon versus different loadings of iron carbonate and gasification temperatures according to one embodiment described herein.
Figure 5B:
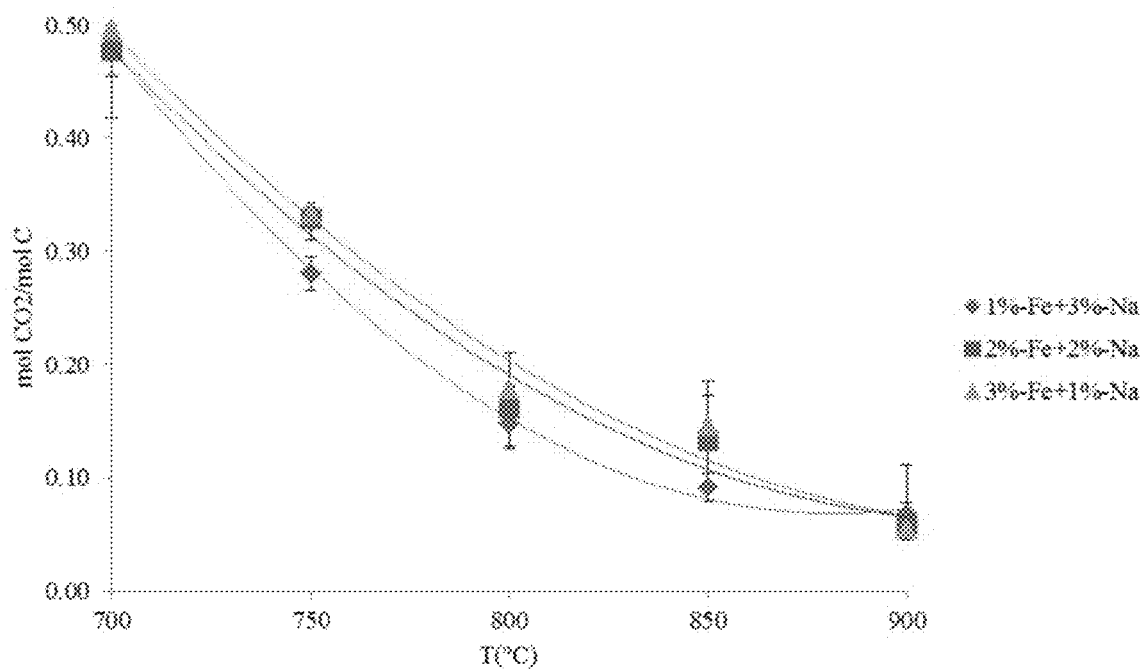
FIG. 5B is a graph illustrating the average molar yield of $CO_2$ with error bars per mole of carbon in the char carbon versus different loadings of iron carbonate and gasification temperatures according to one embodiment described herein.

FIG. 3 is a graph illustrating the hydrogen molar yield (normalized per mole of carbon in the char) as a function of iron loading and pyrolysis temperature. In a previous study of pure iron catalyzed coal gasification, the mass fraction of iron was directly correlated to hydrogen yields. However, the situation is further complicated for coal gasification with $FeCO_3$—$Na_2CO_3$ composite catalysts. In general, higher loadings of iron generally produce higher yields of $H_2$ as indicated in FIG. 3 with the exception of the 3%-Fe+1%-Na catalyst and coal mixture, which produced the least amount of hydrogen among all the studied catalysts and coal mixtures per mole of carbon in the char. This effect is related to the higher rate of conversion of the 3%-Fe+1%-Na mixture as compared to the other composite mixtures, which was also observed during pyrolysis. Much of the hydrogen formed during the gasification step was obtained from $H_2O$ through the water associated reactions including water gas shift (WGS) reaction, as listed in reactions 1-5 below. Table 2 illustrates the moles of $H_2$ per mole of C generated only from water.

TABLE 2

| T(° C.) | 1%-Fe + 3%-Na | 2%-Fe + 2%-Na | 3%-Fe + 1%-Na | 4%-Fe + 0%-Na |
|---|---|---|---|---|
| 700 | 1.32 | 1.33 | 1.22 | 1.48 |
| 750 | 1.27 | 1.23 | 1.22 | 1.43 |
| 800 | 1.16 | 1.23 | 1.07 | 1.38 |
| 850 | 1.13 | 1.22 | 1.09 | 1.33 |
| 900 | 1.12 | 1.18 | 1.09 | 1.17 |

The coal loaded with the 4%-Fe+0%-Na catalyst produced the highest amount of hydrogen. The hydrogen production at 800° C. increased from 1.25 mol $H_2$/mol C with raw coal to 1.45 mol $H_2$/mol C with the 4%-Fe+0%-Na catalyst and coal mixture, a 15.82% increase. Uses of 2%-Fe+2%-Na and 1%-Fe+3%-Na catalysts led to higher yields of hydrogen at different temperatures than the 3%-Fe+1%-Na catalyst and the pure sodium catalysts and coal mixtures in general. For example, at 800° C. the production increased from 1.15 mol $H_2$/mol C with the 0%-Fe+4%-Na catalyst and coal mixture to 1.32 mol $H_2$/mol C with the 2%-Fe+2%-Na catalyst and coal mixture, a 14.8% increase. The metallic iron in the ash layer is the major driving force for hydrogen production. The iron oxide can react with carbon, forming metallic iron and carbon monoxide, which subsequently reacts with water to form hydrogen. The catalytic hydrogen production mechanism can be briefed as with the following reactions:

$$Fe+H_2O \rightarrow Fe(O)+H_2 \tag{R1}$$

$$Fe(O)+C \rightarrow C(O)+Fe \tag{R2}$$

$$C(O) \rightarrow CO \tag{R3}$$

$$CO+H_2O \rightarrow CO_2+H_2 \text{ or} \tag{R4}$$

$$C+2H_2O \rightarrow CO_2+2H_2. \tag{R5}$$

The production of hydrogen with the $Fe_2CO_3$—$Na_2CO_3$ composite catalysts and coal mixtures is lower than that of the pure iron catalyst (4%-Fe+0%-Na) loaded coal. This is partially due to the presence of sodium ions during gasification, which can lower $H_2$ production compared to that obtained without the presence of sodium ions. Temperature has an inverse effect on the yield of $H_2$ (See e.g., FIG. 3) as observed for non-catalyzed and catalyzed coal gasifications because the equilibrium of the reactions related to hydrogen production (i.e., R1 and R4, or R5) shifts to the left as the temperature increases. As the gasification temperature increases, the composition of CO in the mixture starts to increase, and iron carbides and iron oxides become the only iron species present, which leads to decreases in hydrogen production.

FIGS. 4A, 4B, 5A, and 5B are graphs illustrating the molar yields of CO and $CO_2$ normalized per mole of carbon in the gasified char. As shown in FIGS. 4A-4B and FIGS. 5A-5B, the production of CO and the $CO/CO_2$ ratio increases as the temperature increases. This increase can be related to the shift of equilibriums of the water gas shift and the Boudouard reactions among others. For the composite catalyst and coal mixtures, the effect of higher loadings of iron and lower loadings of sodium was a decreased production of CO, except at 900° C. At this temperature the catalytic effect of both sodium and iron on the aforementioned reactions is almost negligible; therefore, the reported molar yields of CO were almost identical for the three catalysts. However, at 800° C. the use of composite catalysts led to a 53.4% increase in the production of CO compared to the use of pure iron catalyst (0.54 mol CO/mol C with the 4%-Fe+0% Na catalyst loaded coal, and 0.83 mol CO/mol C with the 3%-Fe+1%-Na catalyst and coal mixture). Sodium carbonate as one component of the composite catalyst also affects the gasification of the PRB coal and the associated catalytic mechanism can be summarized as:

$$Na_2CO_3+C \rightarrow 2Na+CO_2+CO \tag{R6}$$

$$2Na+H_2O \rightarrow Na_2O+H_2 \tag{R7}$$

$$Na_2O+C \rightarrow 2Na+C(O) \tag{R8}$$

$$xNa+yCO_2 \rightarrow Na_xO_y+yCO \tag{R9}$$

In sodium-based catalytic coal gasification the addition of $Na_2CO_3$ yields the dissociation of metallic sodium during the pyrolysis step which has a strong potential as a reducer for water which yields hydrogen and sodium oxide (R6 and R7). Subsequently, sodium oxide catalyzes the production of CO via the oxidation of carbon and a following reduction of $CO_2$ by metallic sodium. In these reactions, the equilibrium favors the production of CO as the temperature increases. On the other hand, the catalytic effect of iron on the reactions involved in the production of CO is less extensive with $Na_2CO_3$ and $Fe(NO_3)_3$ being coal gasification catalysts. Furthermore, as the iron loading increases, the $H_2/CO$ ratio increases as well, again with the exception of the 3%-Fe+1%-Na composite catalyst. This is related to the decreased production of $H_2$ with the catalyst as discussed previously in association with FIG. 3 and Table 2.

Time

Figure 6A:
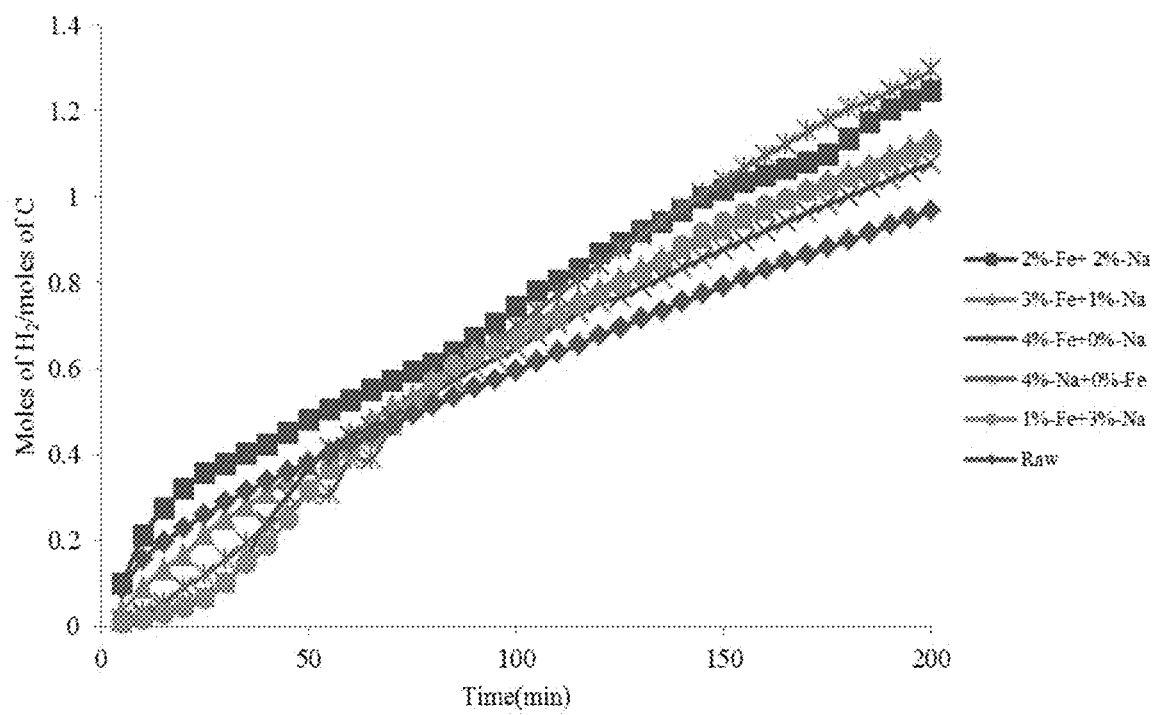
FIG. 6A is a graph illustrating the time effect on $H_2$ production at 700° C. for various composite catalyst mixtures according to one embodiment described herein.
Figure 6B:
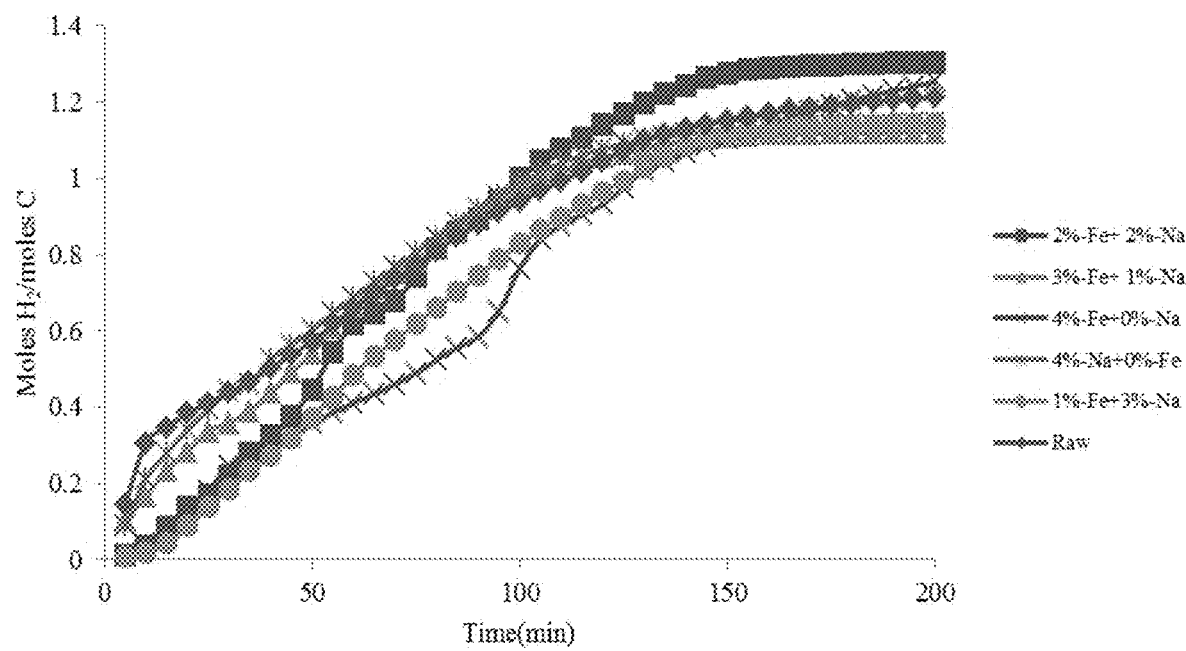
FIG. 6B is a graph illustrating the time effect on $H_2$ production at 800° C. for various composite catalyst mixtures according to one embodiment described herein.
Figure 6C:
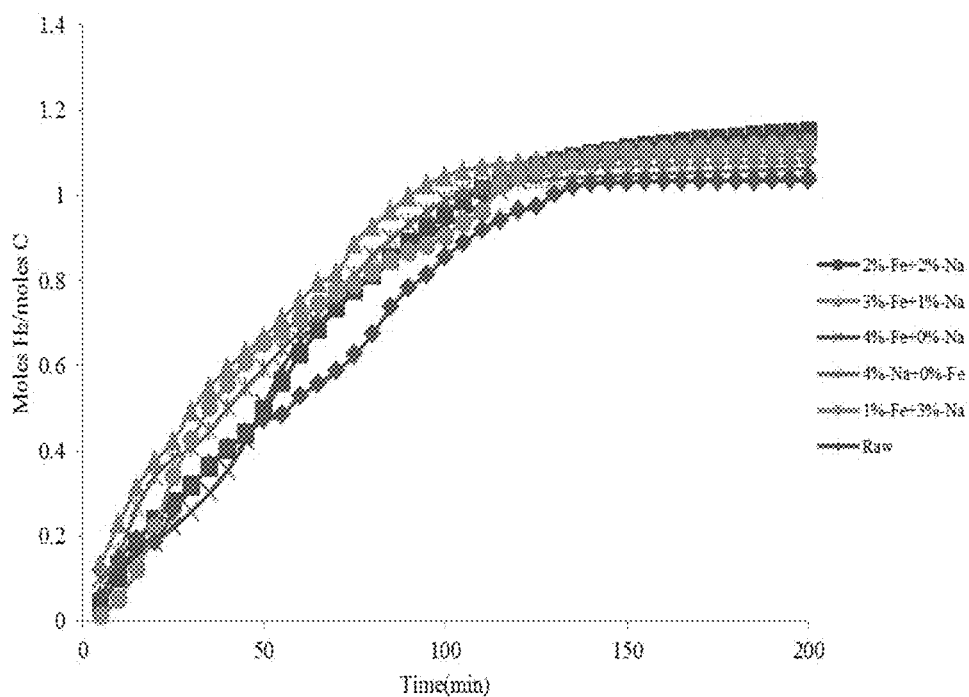
FIG. 6C is a graph illustrating the time effect on $H_2$ production at 900° C. for various composite catalyst mixtures according to one embodiment described herein.

FIGS. 6A-6C are graphs illustrating the trend of $H_2$ production as a function of time at different temperatures for the two pure and three composite catalysts and coal mixtures evaluated. At 700° C. the highest observable value corresponds to the 0%-Fe+4%-Na catalyst and coal mixture. This observation is due to the increased reaction rate with pure sodium catalyst loaded coals because, as time proceeds, the overall production of $H_2$ is lower than that of the composite catalysts and coal mixtures and the pure iron catalyst loaded coal. The increased reaction rate is more evident as the temperature increases. At 900° C. (FIG. 6C), when the reaction is complete, the overall yield of hydrogen with the 0%-Fe+4%-Na catalyst and coal mixture is the lowest. Nonetheless, the effect of sodium in the composite catalysts is not completely undesirable, as it is an aid in accelerating hydrogen production.

Pure sodium catalysts lead to faster hydrogen generation rates than pure iron catalysts. Therefore, an interesting balance between the production rate of this gas and the overall yield is obtained when using composite catalysts. In this case, the 2%-Fe+2%-Na catalyst and coal mixture demonstrates considerable advantages, as it produces hydrogen at a faster rate than all of the composite catalysts and coal mixtures, while being slower than the pure sodium catalyst loaded coal only during few stages of the reaction at different temperatures. In the case of the 3%-Fe+1%-Na catalyst loaded coal, the results demonstrate again a reduced yield of hydrogen compared to the other composite catalyst loaded coals. In general, the effect of composite catalysts is superior in terms of efficiency and total yield in production of hydrogen when compared to pure iron or pure sodium catalysts.

Figure 7A:
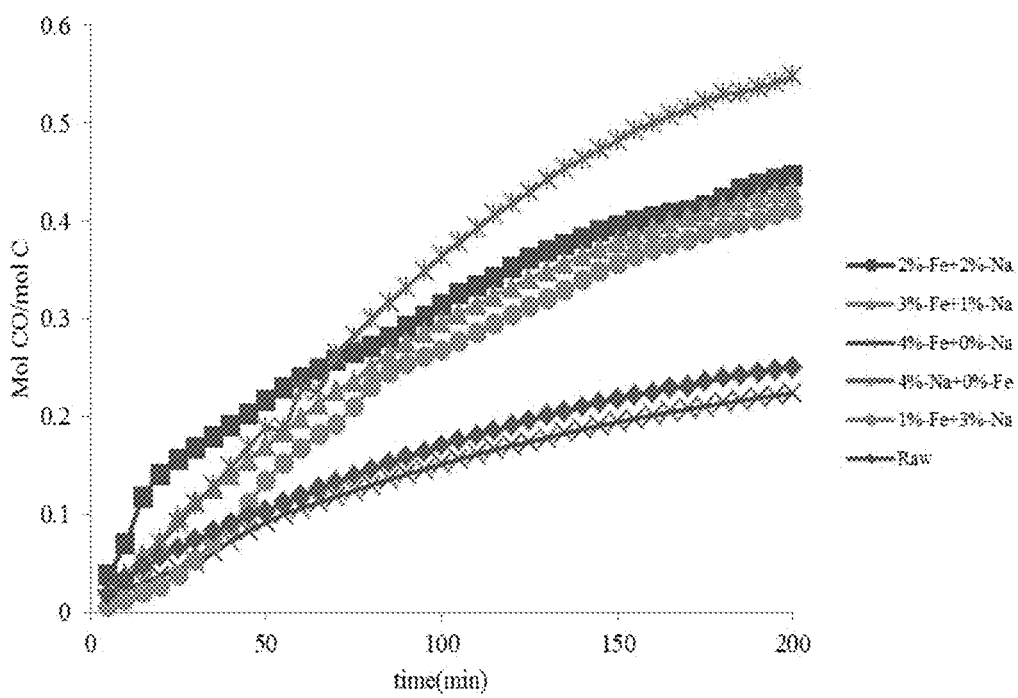
FIG. 7A is a graph illustrating the time effect on the production of CO at 700° C. for various composite catalyst mixtures according to one embodiment described herein.
Figure 7B:
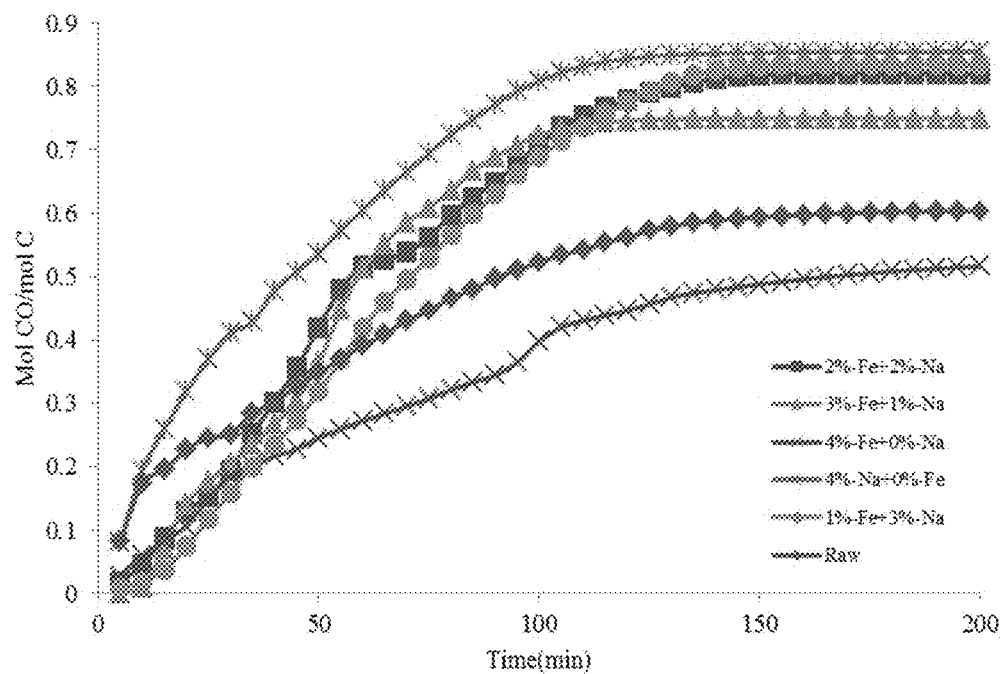
FIG. 7B is a graph illustrating the time effect on the production of CO at 800° C. for various composite catalyst mixtures according to one embodiment described herein.
Figure 7C:
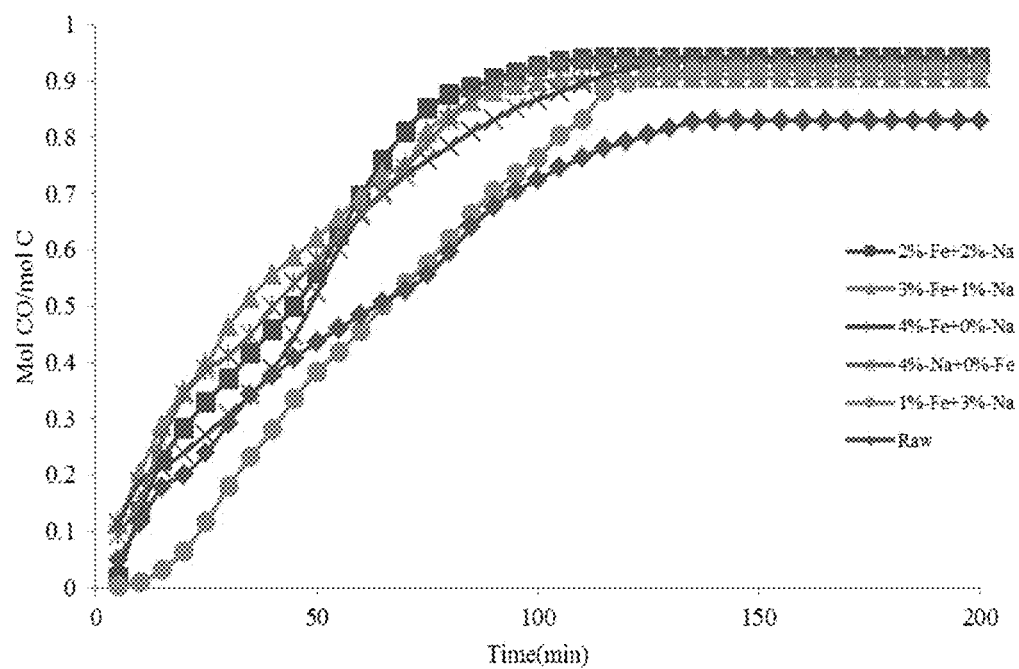
FIG. 7C is a graph illustrating the time effect on the production of CO at 900° C. for various composite catalyst mixtures according to one embodiment described herein.

FIGS. 7A-7C are graphs illustrating the trend of CO production as a function of time at different temperatures for the tested catalyst and coal mixtures. The rates and overall yields of CO increase with sodium concentration of either pure catalysts or composite catalysts. The composite catalyst and coal mixtures showed a notable advantage in terms of CO rates of production over the pure iron catalyst loaded coal (4%-Fe+0%-Na), while the primacy in terms of the overall efficiency was obtained with the pure sodium catalyst loaded coal (0%-Fe+4%-Na), except at 900° C. at which all the mixtures have a negligible effect in the production of CO. The mechanisms through which $Na_2CO_3$ enhances the rate and the overall production of CO include the oxidation step of carbon through $Na_2O$ and a subsequent reduction of $CO_2$ by metallic sodium as presented in R6 through R9. In R8, $Na_2CO$ serves as a carbon oxidizer. However, the CO generated during gasification with iron being a catalyst through R1-R3 and $H_2O$ cannot be completely reacted to $H_2$ through the water gas shift reaction since gasification temperatures (700-900° C.) are not within the favorable temperature range for this reaction.

Effects of Catalysts on Carbon Conversion Kinetics

Conversion

Figure 8A:
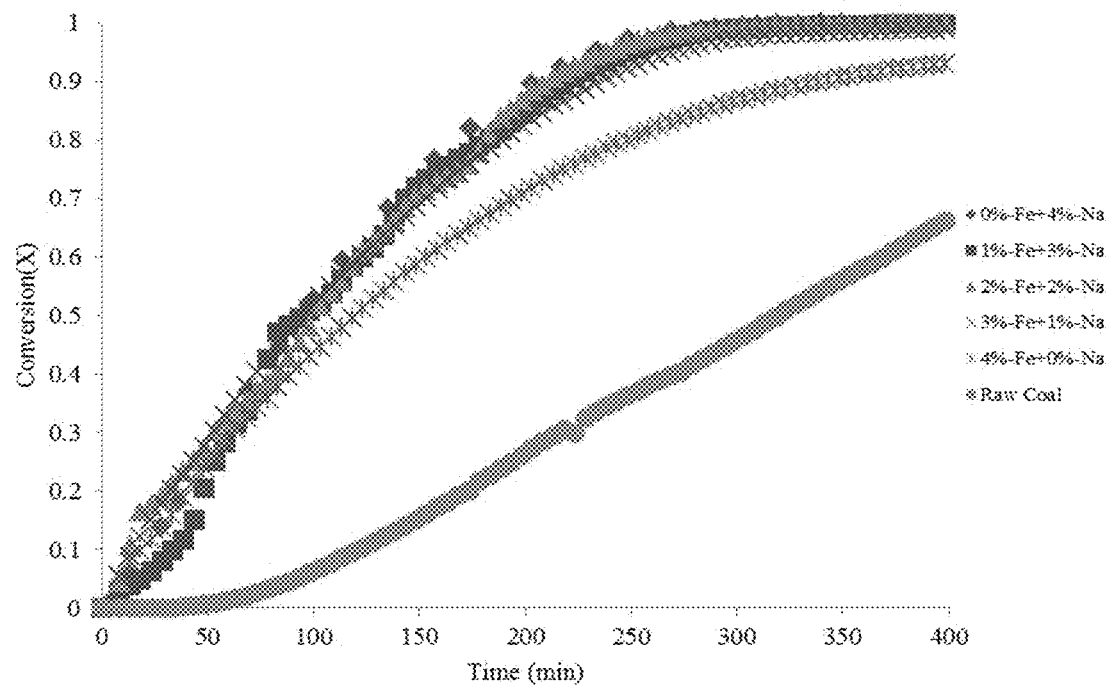
FIG. 8A is a graph illustrating conversion versus time for various composite catalysts, pure catalysts, and raw coal at 700° C. according to one embodiment.
Figure 8B:
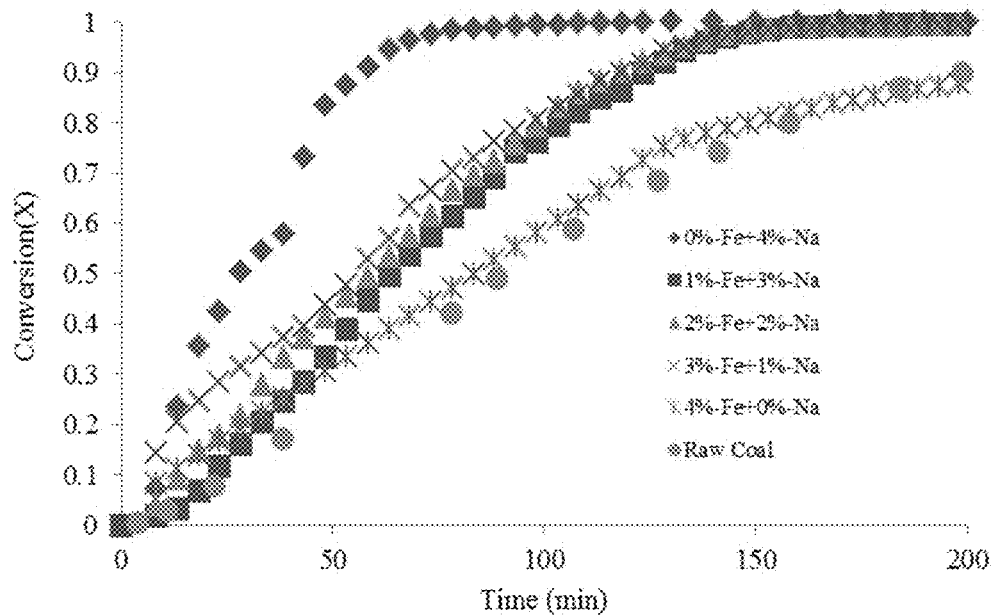
FIG. 8B is a graph illustrating conversion versus time for various composite catalysts, pure catalysts, and raw coal at 800° C. according to one embodiment.
Figure 8C:
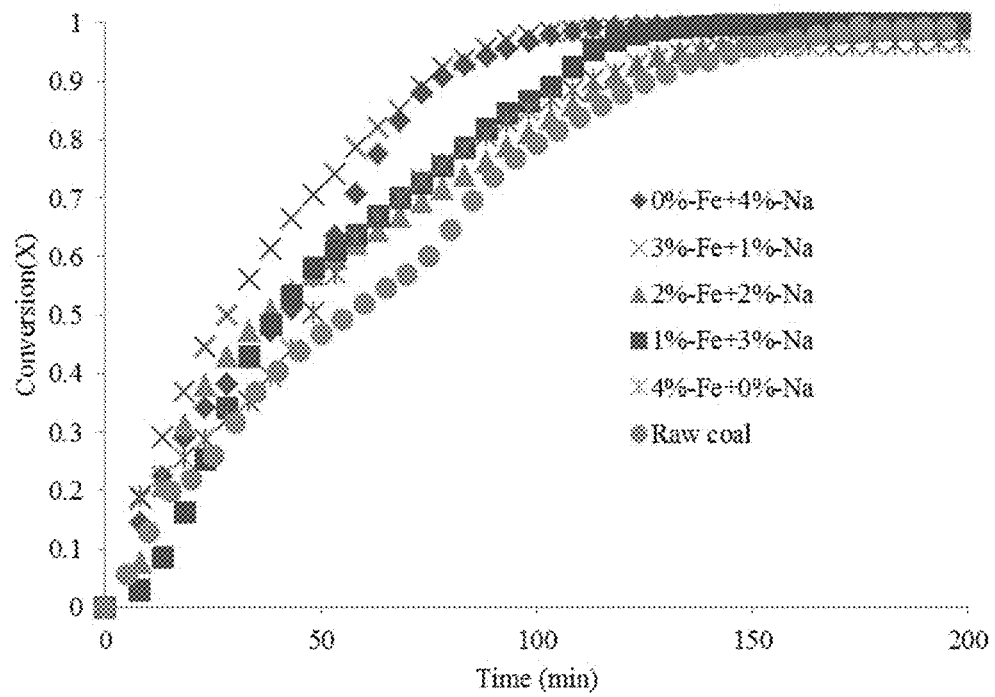
FIG. 8C is a graph illustrating conversion versus time for various composite catalysts, pure catalysts, and raw coal at 900° C. according to one embodiment.

FIGS. 8A-8C are graphs illustrating the coal conversion plots at 700° C., 800° C., and 900° C., in which the enhanced carbon conversion rates for all of the catalysts, especially of the 3%-Fe+1%-Na catalyst, during the gasification process, are improved relative to the uncatalyzed gasification. The effect of the catalysts is particularly pronounced at the lower reaction temperatures, where the conversion of carbon in raw coal is considerably slower than that of the catalyzed coal. The use of the catalysts may reduce the gasification temperature. The 4%-Fe+0%-Na catalyst shows improved performance in terms of conversion rate than raw coal at 700° C.; nevertheless, as the gasification temperature increases, the improvement is hindered, especially in the later period of gasification, as can be observed in FIGS. 8B and 9C in which raw coal shows a higher slope during this portion and at 900° C., after 150 minutes, or the conversion rate (not total carbon conversion) of raw coal is already higher than those of catalyzed coal. This effect can be directly explained by the proposed iron-catalyzed coal gasification mechanism in which metallic iron in the form of γ-Fe can be present but has no catalytic effect due to its lack in mobility.

Furthermore, if cementite is still present at such temperatures, the catalytic effect disappears because iron carbides are inert species and make the overall gasification process slower by creating mass transfer resistance. Conversely, the 0%-Fe+4%-Na catalyst and coal mixture presents higher conversions rates at all temperatures. The composite catalyst and coal mixtures show the previously discussed trend, in which the 3%-Fe+1%-Na catalyst loaded coal demonstrates a higher carbon conversion rate; which is even more evident as the temperature increases. At 700° C., the effect of this catalyst is fairly similar to those of the other composite catalysts; thus, to gasify coal at this temperature, the use of iron and sodium as catalysts has a very similar effect at different compositions and the optimal iron to sodium ratio may be decided to achieve desired gas yields or tar alleviation capacities. At 800° C. and 900° C., the effect of 3%-Fe+1%-Na catalyst, is considerably more noticeable. For example, at 800° C., the carbon conversion is faster than those obtained with other composite catalysts and coal mixtures. Furthermore, at 900° C., the conversion rate is better than that of 0%-Fe+4%-Na during the earlier period of gasification. As previously discussed, such behavior can be referred to an enhanced mobility of the catalytic iron species when sodium is present; hematite and α-Fe, which play an important role during the later stage of the gasification process, are activated due to the presence of metallic sodium ions. Further evidence of these effects has previously been described in the devolatilization rates observed during the pyrolysis stage shown in FIG. 2.

Shrinking Core Model

The gasification kinetics was quantified in the 700-900° C. temperature range. The shrinking core model was used to represent the coal gasification kinetics studied in this research. The shrinking core model is based upon the following equation $$-\frac{dX}{dt} = k_{SC}(1-X)^{2/3} \quad (E1)$$

where X is the carbon conversion fraction, t is time, and $k_{sc}$ is the specific carbon conversion rate constant.

The model assumes that the overall rate is essentially equal to the observed rate of reaction, while the diffusivity rate constant can be neglected. Diffusion resistances for gasification products (CO and $H_2$) are negligible. In the first stage, coal particle has a film boundary layer through which steam gas diffuses to the surface to react with carbon. For the composite catalytic coal gasification, species such as $Fe_3O_4$ and $Na_2CO_3$ are predominantly present on the carbon surface and thus influence the reaction between carbon and water vapor. Temperature and composition of reaction products including CO and concentrations of the catalytic species such as FeO and $Na_2O$ play important roles at the beginning of gasification. Subsequently, an intermediate layer is formed and the interface between reaction intermediates and the unreacted core moves toward the center of coal particle. This movement is assumed to occur uniformly. Thus, a reduction of the char particle radius must take place as gasification advances since at this point of the catalytic gasification reaction, most of the gaseous products are formed. The reaction rate decreases when the gasification nears completion at the core because active sites on char particle become less available and shrinking core models cannot accurately represent the gasification kinetics. Therefore, E1 was applied to fit the data collected in the earlier stage of gasification. The fittings were successful and the calculated reaction rate constants are listed in Table 3.

TABLE 3

| T (° C.) | 0%-Fe + 4%-Na | 1%-Fe + 3%-Na | 2%-Fe + 2%-Na | 3%-Fe + 1%-Na | 4%-Fe + 0%-Na | Raw coal |
|---|---|---|---|---|---|---|
| 700 | 0.0028 | 0.0018 | 0.0020 | 0.0022 | 0.00140 | 0.0009 |
| 750 | 0.0045 | 0.0027 | 0.0033 | 0.0032 | 0.0022 | 0.0015 |
| 800 | 0.0052 | 0.0032 | 0.0046 | 0.0044 | 0.0022 | 0.0020 |

TABLE 3-continued

| T (° C.) | 0%-Fe + 4%-Na | 1%-Fe + 3%-Na | 2%-Fe + 2%-Na | 3%-Fe + 1%-Na | 4%-Fe + 0%-Na | Raw coal |
|---|---|---|---|---|---|---|
| 850 | 0.0058 | 0.0047 | 0.0052 | 0.0049 | 0.0041 | 0.0037 |
| 900 | 0.0072 | 0.0057 | 0.0064 | 0.0071 | 0.0049 | 0.0060 |

Rate Constants

The values of reaction rate constant ($k_{SC}$) derived with E1 under different catalytic gasification conditions are listed in Table 3. $k_{SC}$ increases result from the uses of composite catalysts, while it does not necessarily change linearly with the concentrations of sodium and iron, which is confirmation of previous findings that pure iron catalysts enhance the rate of the reaction only through a portion of the process as conversion progresses, while pure sodium based catalysts increase the reaction rate over the entire range. The increases in mobility of the iron species due to the presence of sodium in composite catalysts may improve gasification kinetics and thus the $k_{SC}$ values. For example, the $k_{SC}$ value of 3%-Fe+1%-Na catalyst and coal mixture is 0.0044 min$^{-1}$ at 800° C., while the value obtained with the 4%-Fe+0%-Na catalyst and coal mixture is 0.0022 min$^{-1}$ at the same temperature, a 50% improvement. At 700° C., the use of the composite catalyst increased the conversion rate constant from 0.0012 min$^{-1}$ with raw coal to 0.0022 min$^{-1}$ when using the 3%-Fe+1%-Na catalyst, an increase of 1.83 times. At 800° C., an increase of 1.5 times in the conversion rate constant was observed with the use of this catalyst over non-catalytic coal gasification, for which a $k_{sc}$ value of 0.0029 min$^{-1}$ was obtained. Moreover, the rates of reaction are considerably higher in the case of the pure sodium catalyst and coal mixture (0%-Fe+4%-Na) compared to those of raw coal, whereas some of the reaction rates of the pure iron catalyst and coal mixture (4%-Fe+0%-Na) are lower than those of raw coal.

Therefore, when iron and sodium are present together during gasification, they may function synergistically through the formation of sodium ferrites ($Na_xFe_yO$) or similar complexes during the gasification process at certain compositions of the catalysts. The synergy may exist in different ways. For example, the catalytic effect of iron on coal gasification may be enhanced by its coexistence with sodium due to the function of the latter in improving the mobility of iron.

Figure 9A:
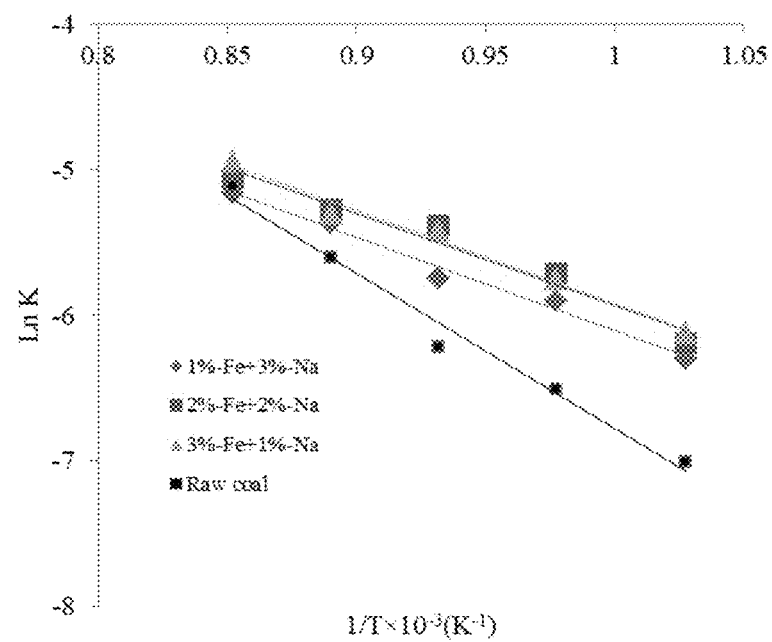
FIG. 9A illustrates an Arrhenius plot depicting the effect of temperature on the gasification reaction rate constant of three composite catalysts and raw coal according to one embodiment described herein.
Figure 9B:
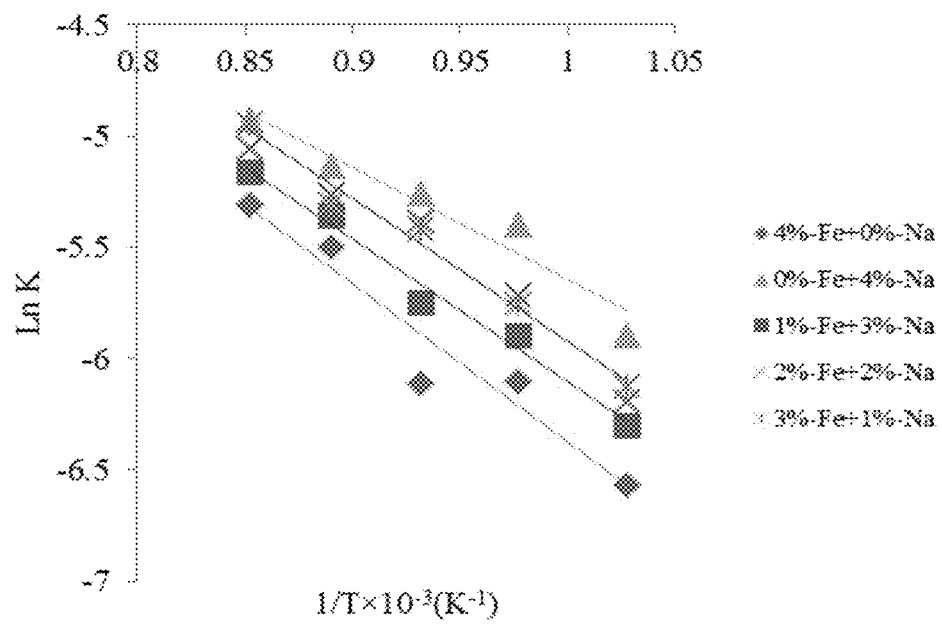
FIG. 9B illustrates an Arrhenius plot depicting the effect of temperature on the gasification reaction rate constant of pure iron catalyst, pure sodium catalyst, and raw coal.
Figure 9C:
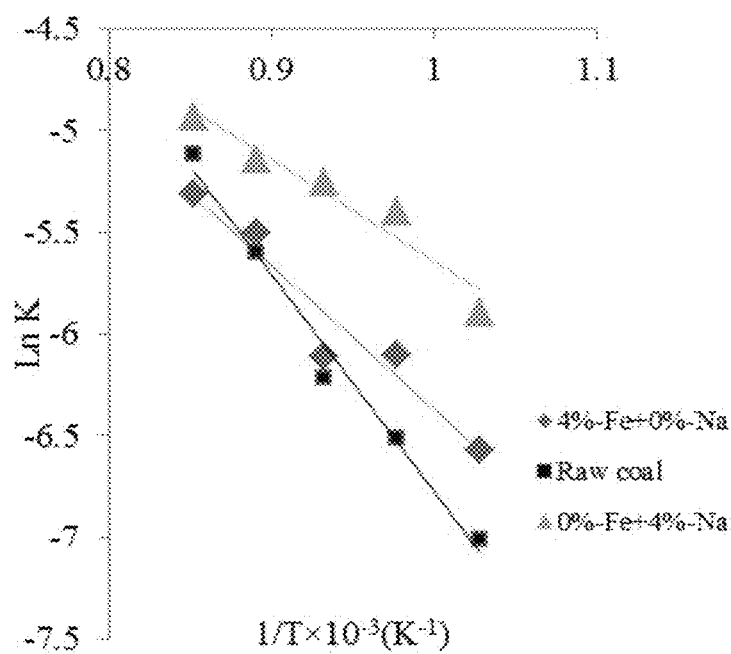
FIG. 9C illustrates an Arrhenius plot depicting the effect of temperature on the gasification reaction rate constant of pure iron catalyst, pure sodium catalyst, and composite catalysts.

FIGS. 9A-9C show Arrhenius plots for the carbon conversions accelerated by the composite catalysts. The comparisons of carbon conversion reaction rate constants indicate that the 3%-Fe+1%-Na catalyst and coal mixture is better than the 2%-Fe+2%-Na catalyst and the 1%-Fe+3%-Na catalyst. The superiority of the 3%-Fe+1%-Na catalyst when compared to the 2%-Fe+2%-Na catalyst is not fully evident in FIG. 9A because during the first stage of the reaction during which the shrinking core model is applicable, the difference between these two catalysts is trivial. At high temperature range, raw coal is superior to the pure-iron catalyst (4%-Fe+0 %-Na) (See e.g., FIG. 9C). The rate determining step of alkali metals based catalytic coal gasification mechanism is the decomposition of an intermediate carbon oxygen surface species, which refers to R6 for the case of the sodium catalyzed gasification. However, Suzuki et al. demonstrated that when using this type of composite catalysts, the rate determining step is the oxygen transfer from the metal oxide species, namely $Na_2O$ and $Fe_3O_4$. The increased oxygen transfer in the case of $Fe_3O_4$ may be a result of the enhanced mobility created by the presence of metallic sodium; consequently an improvement in the reaction rates of R6 through R9 is expected.

Based on the obtained results in Table 3, sodium may increase the gasification rate more significantly than iron because the $k_{sc}$ values obtained with 3%-Fe+1%-Na are always higher than those with 4%-Fe+O %-Na. The rate constants achieved with all the composite catalysts are not only higher than those without catalysts or with the raw PRB coal but also higher than those with pure iron catalysts, while lower than those with pure sodium catalysts in the temperature range of 700-850° C. The relative difference decreases with temperature. For example, at 700° C., the rate constant with 2%-Fe+2%-Na is about 42% higher than that with the 4%-Fe+0%-Na, while the difference is about 30% at 900° C.

Activation Energies

A decrease in the activation energies with the use of any of the studied catalysts was observed when compared to the result exhibited by raw coal. The composite catalysts reduce the activation energy of carbon conversion in about 30-40%. The activation energy obtained with non-catalytic coal gasification was 89.0 kJ/mol and it was reduced to about 52 kJ/mol with the use of the 2%-Fe+2%-Na catalyst. In the case of the other catalysts and coal mixtures, the activation energies were the following: $E_{a0\%-Fe+4\%-Na}$=42.0 kJ/mol, $E_{a1\%-Fe+3\%-Na}$=kJ/mol 53.3, $E_{a3\%-Fe+1\%-Na}$=53.4 kJ/mol and $E_{a4\%-Fe+0}$%-Na=59.2 kJ/mol. The corresponding Arrhenius forms of the PRB coal gasification processes with the five catalysts are provided below:

$$k_{4\%-Fe+0\%-Na} = A_{4\%-Fe+0\%-Na} e^{-E_a(4\%-Fe+0\%-Na)/RT} \quad (E2)$$

$$k_{3\%-Fe+1\%-Na} = A_{3\%-Fe+1\%-Na} e^{-E_a(3\%-Fe+1\%-Na)/RT} \quad (E3)$$

$$k_{2\%-Fe+2\%-Na} = A_{2\%-Fe+2\%-Na} e^{-E_a(2\%-Fe+2\%-Na)/RT} \quad (E4)$$

$$k_{1\%-Fe+3\%-Na} = A_{1\%-Fe+3\%-Na} e^{-E_a(1\%-Fe+3\%-Na)/RT} \quad (E5)$$

$$k_{0\%-Fe+4\%-Na} = A_{0\%-Fe+4\%-Na} e^{-E_a(0\%-Fe+4\%-Na)/RT} \quad (E6)$$

The above equations indicate that use of catalysts, including composite catalysts, leads to decreases in the pre-exponential factors due to the fact that catalytic species on coal surface reduce the collision frequencies of reactants. However, the net effects of the catalysts on the PRB coal gasification are positive at the tested temperatures due to their roles in significant reductions of the activation energy.

Application of the Shrinking Core Model to the Yields of Individual Carbonaceous Products The shrinking core model has been typically utilized to derive particle associated reaction kinetics. It has been employed not only to study the carbon conversion kinetics discussed above, but also to model the yielding of each carbonaceous gas as follows. When $X_i$ (i=CO, $CO_2$, $CH_4$) is defined as $$X_i = \frac{N_{i,t}}{N_{i,e}} \quad (E7)$$

where $N_{i,t}$ refers to the moles of carbonaceous gas (i) generated or moles of carbon converted to produce the carbonaceous gas (i) at any time and $N_{i,e}$ is the total mole of carbonaceous gases generated or the total moles of carbon converted to produce the carbonaceous gas at the end of the gasification, $k_{sc,i}$ is the generation rate constant of i. Combining E1 and E7 leads to:

$$-\frac{d\left(\frac{N_{i,t}}{N_{i,e}}\right)}{dt} = k_{sc,i}\left(1 - \frac{N_{i,t}}{N_{i,e}}\right)^{2/3} \quad (E8)$$

The integral form of E8 is:

$$N_{i,t} = \left[1 - \left(-\frac{k_{sc,i}t}{3} + 1\right)^3\right] * N_{i,f}, \text{ or} \quad (E9)$$

$$\left(\frac{N_{i,f} - N_{i,t}}{N_{i,f}}\right)^{\frac{1}{3}} = -\frac{k_{sc,i}}{3}t + 1. \quad (E10)$$

Figure 10A:
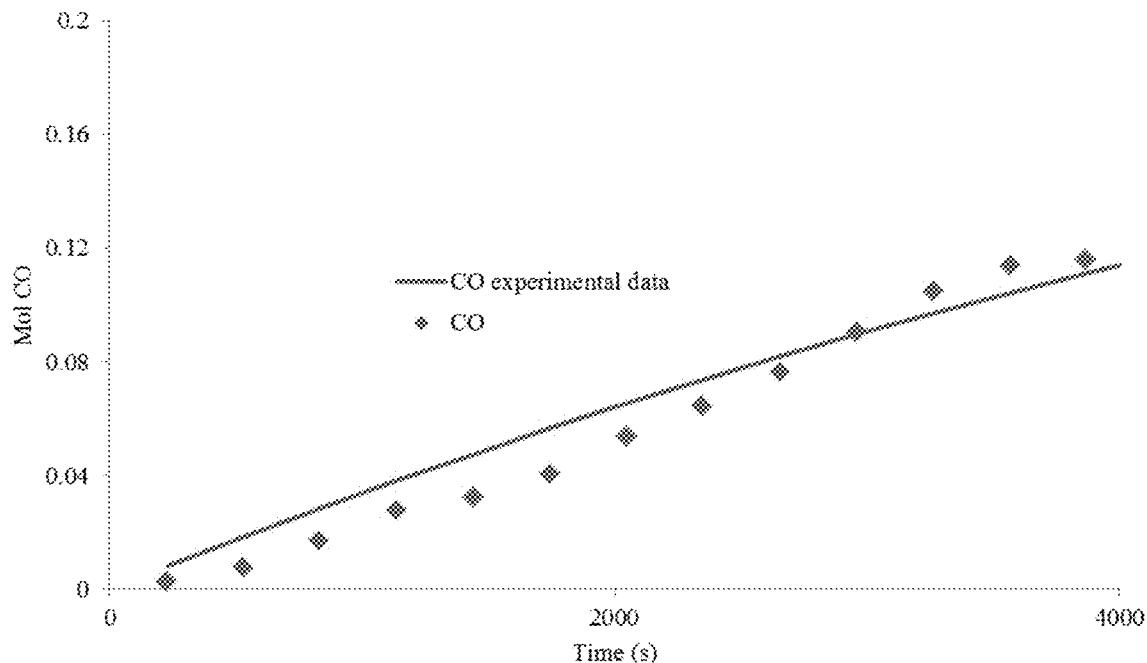
FIG. 10A is a graph illustrating carbonaceous gas yielding data fitting CO with extended shrinking core model according to one embodiment described herein.
Figure 10B:
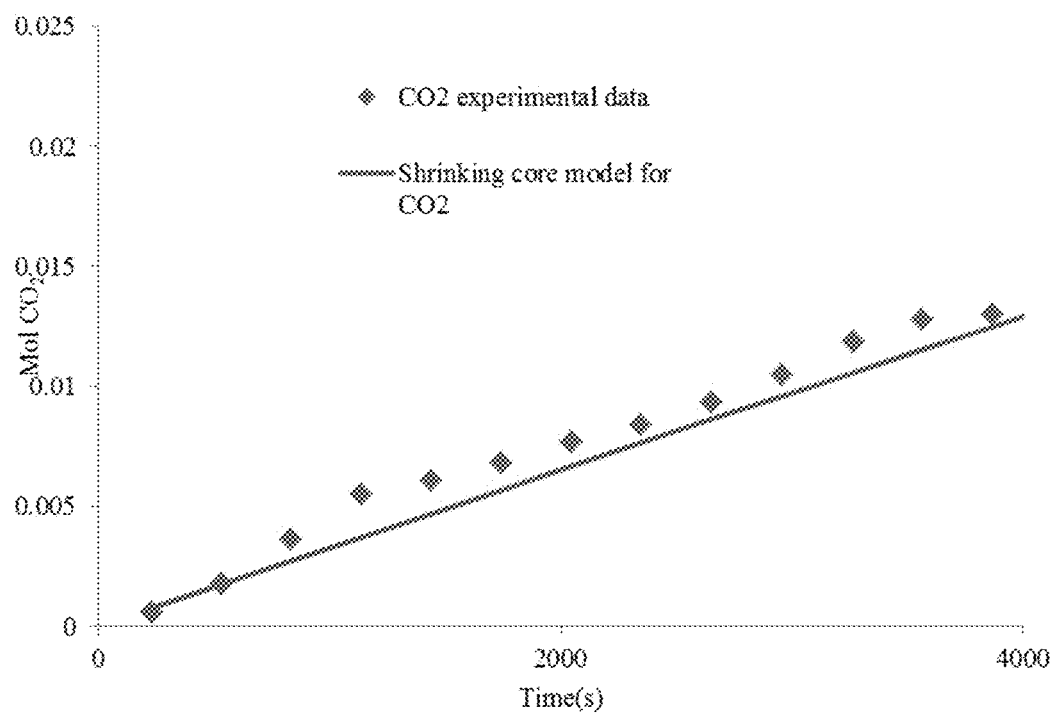
FIG. 10B is a graph illustrating carbonaceous gas yielding data fitting $CO_2$ with extended shrinking core model according to one embodiment described herein.
Figure 10C:
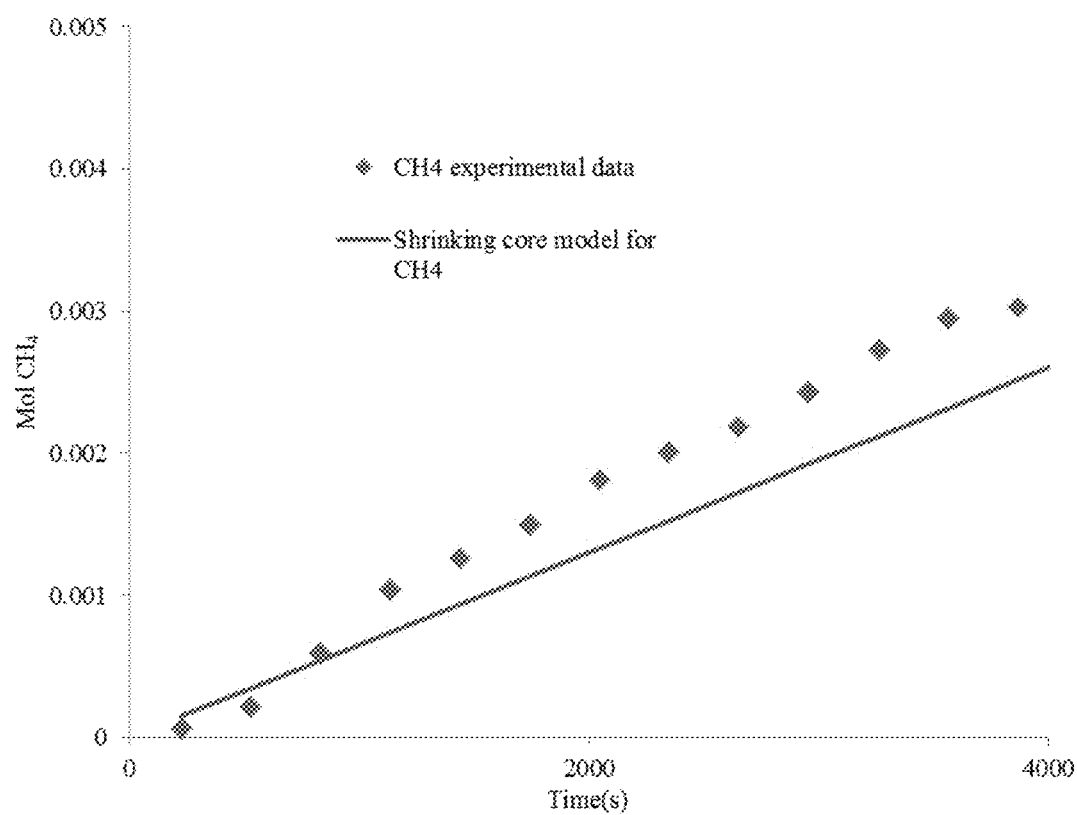
FIG. 10C is a graph illustrating carbonaceous gas yielding data fitting $CH_4$ with extended shrinking core model according to one embodiment described herein.

E10 was used to model the yields of CO, $CO_2$ and $CH_4$ from the 2%-Fe+2%-Na catalyzed PRB coal gasification process at 800° C. as shown in FIGS. 10A-10C. The resulting generation rate constants of the three gases are $k_{SC,CO}$=1.62×10$^{-4}$, $k_{SC,CO2}$=1.50×10$^{-5}$ and $k_{SC,CH4}$=2.97×10$^{-6}$. The fittings are based on the regression coefficients of FIGS. 10A-10C. E10 was not used to model hydrogen production data because the majority of the hydrogen produced comes from water instead of coal or char.

CONCLUSIONS

The apparatus and methods described herein allow for improved rates of carbon conversion under different conditions by using the composite catalyst ($FeCO_3$—$Na_2CO_3$) and coal mixtures when compared to those obtained from raw coal, pure sodium catalyst and coal mixture, and pure iron catalyst and coal mixture. The use of the composite catalyst $FeCO_3$—$Na_2CO_3$ on coal gasification improves the yields of useful gases including hydrogen and carbon monoxide. The composite catalyst may be used to utilize the advantages of its two component catalysts and overcome their individual shortcomings. Furthermore, the $FeCO_3$—$Na_2CO_3$ catalyst, compared to raw coal, may increase the carbon conversion rate by about two times within the 700° C.-800° C. range due to its ability to reduce the activation energy of gasification by about 30-40%. Compared to pure sodium and pure iron catalysts, the composite catalyst may increase the yields of desired products $H_2$ and CO at 800° C. by 14.8% and 40.2%, respectively. Therefore, the apparatus and methods of the present disclosure allow for efficient commercial-scale production of the $FeCO_3$—$Na_2CO_3$ catalyst to be used for catalytic coal gasification.

While the foregoing is directed to embodiments of the present disclosure, other and further embodiments of the present disclosure may be devised without departing from the basic scope thereof.

What is claimed is:

1. A coal gasification method, comprising:
    forming a reaction mixture comprising a coal derived powder and a composite catalyst by mixing the coal derived powder and the composite catalyst, wherein the composite catalyst comprises $FeCO_3$ and $Na_2CO_3$;
    heating the reaction mixture to a target temperature between about 700° C. and about 900° C.;
    contacting the reaction mixture with steam;
    flowing the reaction mixture and the steam into a gasifier;
    flowing nitrogen into the gasifier;
    maintaining a pressure of the gasifier below 1 atm; and
    forming a syngas mixture from the reaction mixture.

2. The coal gasification method of claim 1, wherein the reaction mixture contains from about 1 wt % to about 5 wt % of the composite catalyst.

3. The coal gasification method of claim 1, wherein the gasifier is a fixed bed gasifier.

4. The coal gasification method of claim 1, further comprising maintaining the reaction mixture at the target temperature for a time between about 100 minutes and about 3,000 minutes.

5. The method of claim 1, wherein the reaction mixture comprises from about 1 wt % to about 3 wt % $FeCO_3$ and from about 1 wt % to about 3 wt % $Na_2CO_3$.

6. The method of claim 1, wherein the reaction mixture comprises about 2 wt % $FeCO_3$ and about 2 wt % $Na_2CO_3$.

7. The method of claim 1, wherein the heating the reaction mixture is performed at a rate of about 20° C./minute.

8. A method of forming a syngas from coal, comprising:
    mixing a powdered coal having a moisture content of at least about 10 wt % with between about 3 wt % and about 5 wt % of a composite catalyst to form a reaction mixture, wherein the composite catalyst comprises $FeCO_3$ and $Na_2CO_3$;
    blending a stoichiometric excess of water vapor with the reaction mixture;
    disposing the reaction mixture in a gasifier;
    adding nitrogen to the gasifier;
    maintaining a pressure of the gasifier below 1 atm; and
    maintaining the reaction mixture in the gasifier at a temperature between about 700° C. and about 900° C. to form a syngas mixture.

9. The method of claim 8, wherein the powdered coal and the composite catalyst are dry mixed to form the reaction mixture.

10. The method of claim 8, wherein the gasifier is a fixed bed gasifier.

11. The method of claim 8, wherein the reaction mixture comprises about 2 wt % $FeCO_3$ and about 2 wt % $Na_2CO_3$.

12. The method of claim 8, wherein the reaction mixture is maintained in the gasifier at the temperature between about 700° C. and about 900° C. for a time between about 100 minutes and about 3,000 minutes.

13. The method of claim 8, wherein the reaction mixture comprises from about 1 wt % to about 3 wt % $FeCO_3$ and from about 1 wt % to about 3 wt % $Na_2CO_3$.

* * * * *